United States Patent
Dekel et al.

(10) Patent No.: US 12,204,746 B2
(45) Date of Patent: Jan. 21, 2025

(54) INTERPOSER FOR SECURE INKING BY STYLUS

(71) Applicant: Microsoft Technology Licensing, LLC, Redmond, WA (US)

(72) Inventors: Shoham Dekel, Tel Aviv (IL); Assaf Bar-Ness, Rehovot (IL); Orr Srour, Ramat-Hasharon (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/517,436

(22) Filed: Nov. 22, 2023

(65) Prior Publication Data

US 2024/0319866 A1    Sep. 26, 2024

Related U.S. Application Data

(63) Continuation of application No. 18/186,640, filed on Mar. 20, 2023, now Pat. No. 11,868,608.

(51) Int. Cl.
*G06F 3/033*     (2013.01)
*G06F 3/01*      (2006.01)
(Continued)

(52) U.S. Cl.
CPC .......... *G06F 3/04883* (2013.01); *G06F 3/016* (2013.01); *G06F 3/03545* (2013.01)

(58) Field of Classification Search
CPC ... G06F 3/04883; G06F 3/016; G06F 3/03545
(Continued)

(56) References Cited

U.S. PATENT DOCUMENTS

| 2002/0101445 A1* | 8/2002 | Berque | H04L 9/40 715/751 |
| 2007/0154116 A1* | 7/2007 | Shieh | G06F 3/0425 382/314 |

(Continued)

FOREIGN PATENT DOCUMENTS

| CN | 105930003 B | 1/2019 |
| WO | 0057262 A1 | 9/2000 |
| WO | 2022131325 A1 | 6/2022 |

OTHER PUBLICATIONS

International Search Report and Written Opinion received for PCT Application No. PCT/US2024/019302, Jul. 1, 2024, 14 pages.

*Primary Examiner* — Jonathan M Blancha
(74) *Attorney, Agent, or Firm* — Weaver IP L.L.C.

(57) ABSTRACT

Systems, methods, and instrumentalities are described herein related to a secured stylus. A secure connection is established between a digitizer processor in a computing device and a remote server providing virtual desktop infrastructure (VDI). A digitizer interposer implemented in the computing device, the server, and/or between them receives raw or encrypted digitizer input that bypasses the operating system (OS) and processor of the computing device. Digitizer signal processing, normally performed by the OS, is performed on one or more servers. An edge server provides haptic feedback to a stylus and/or generates display of temporary digital ink as created while a cloud server completes digital ink processing and generates video for display by the computing device. A secure connection between a graphics processing unit (GPU) and the server protects secure connection video by encryption bypassing the OS and processor of the user computing device.

20 Claims, 6 Drawing Sheets

(51) Int. Cl.
*G06F 3/0354* (2013.01)
*G06F 3/04883* (2022.01)

(58) Field of Classification Search
USPC .......................................................... 345/179
See application file for complete search history.

(56) References Cited

U.S. PATENT DOCUMENTS

2012/0265980 A1    10/2012  Moon
2016/0042201 A1     2/2016  Ninomiya
2017/0090603 A1     3/2017  Cho
2023/0326103 A1    10/2023  Kato

* cited by examiner

INTERPOSER FOR SECURE INKING BY STYLUS

CROSS-REFERENCE TO RELATED APPLICATIONS

This application is a continuation of U.S. patent application Ser. No. 18/186,640, filed Mar. 20, 2023, entitled "INTERPOSER FOR SECURE INKING BY STYLUS," the entirety of which is incorporated by reference herein.

BACKGROUND

A computing device may have multiple types of input devices, such as a keyboard, a mouse, a touch screen, etc. A touch instrument (e.g., also known as a stylus or pen) may be used with a touch screen. A touch instrument enables a user to write or draw on a touch screen in the form of digital ink. The digital ink may be captured as digital data by a digitizer, enabling the digital ink to be used in various applications (e.g., converted to text, etc.). A touch instrument, unlike a keyboard, may provide feedback to users in the form of haptic feedback (e.g., a vibration). Haptic feedback may be time-sensitive relative to an operation associated with the haptic feedback, such that the user should receive the haptic feedback near in time to performance of the operation. Additionally, a touch instrument may be used to interact with secure applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein enable a secured stylus system that provides for secure inking. A secure connection may be established between a digitizer processor in a computing device and a remote server providing a virtual desktop infrastructure (VDI). Embodiments enable the user to connect the computing device to the remote server, to provide stylus input from the computing device to the remote server and receive feedback from the remote server at the computing device, while concealing such input and feedback from the device processor and operating system (OS) of the computing device. Such concealment is enabled by a digitizer interposer.

In an aspect, the digitizer interposer is implemented in the computing device, the server, or between the computing device and server. The digitizer interposer enables raw digitizer input to be protected by encryption and/or by bypassing the OS and processor of a user computing device. Digitizer signal processing, normally performed by the OS, may be distributed among edge and cloud servers by the digitizer interposer. For example, an edge-located digitizer interposer may generate and provide time-sensitive sensory feedback. A secure connection may be established between a graphics processing unit (GPU) of the computing device and the remote server, protecting secure connection video generated by the server by encryption (e.g., digital rights management (DRM)) and/or bypassing the OS and processor of the user computing device.

For example, a digitizer interposer (e.g., internal or external to a computing device) may be configured to receive, from a digitizer processor in a computing device, inking data representative of touch screen operations performed in at least a secure region of a touch screen of the computing device that is displaying at least the secure region generated by a remote server. The digitizer interposer may process the inking data, at least in part, to provide time-sensitive information to the digitizer processor (e.g., haptic feedback, temporary inking for display). The digitizer interposer may provide at least a portion of the inking data to the server, which may be configured to process the inking data and generate video data for display by the computing device representative of the touch screen operations performed in at least the secure region.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
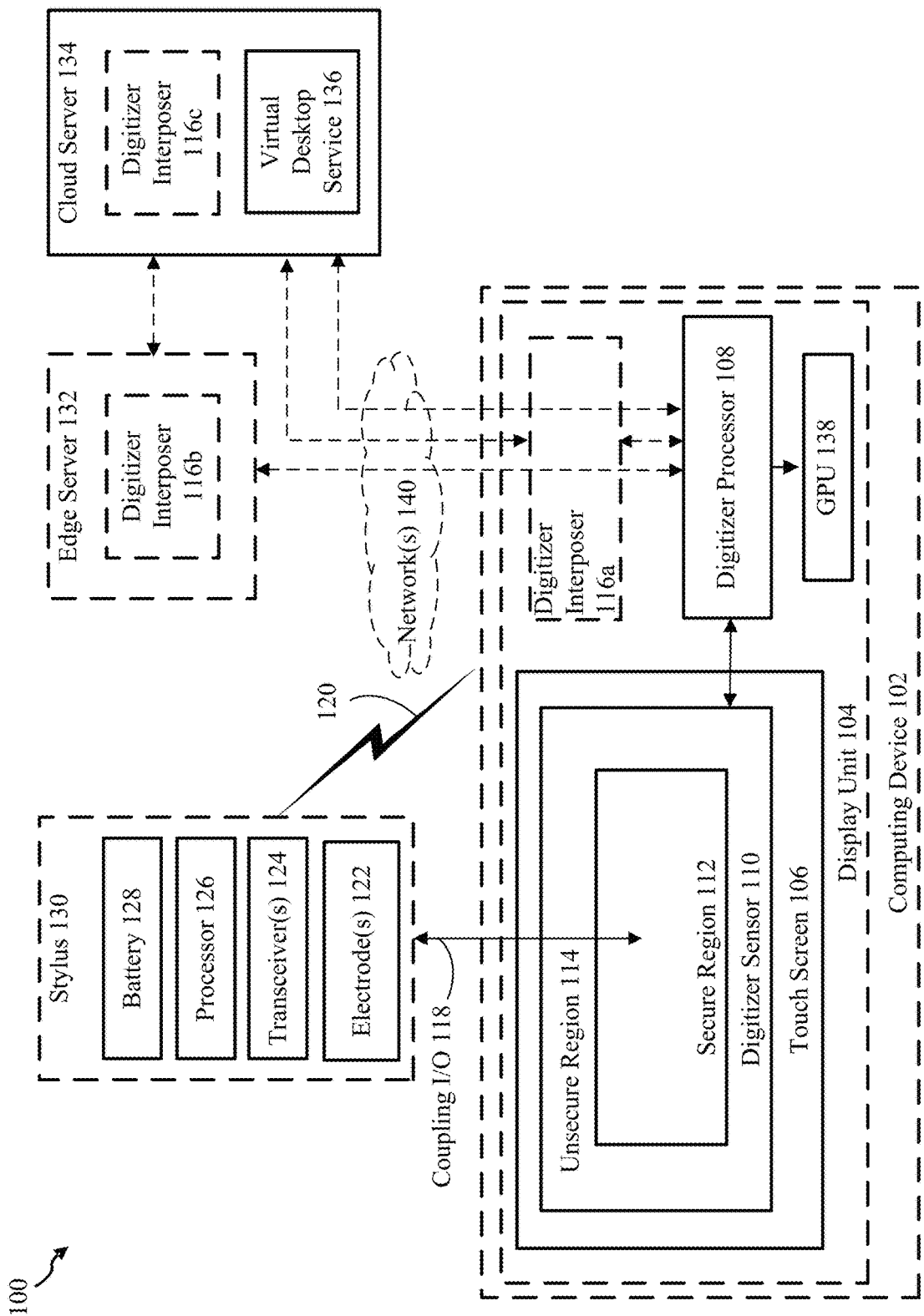
FIG. 1 shows a block diagram of an example system for a secure stylus, in accordance with an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

As set forth in the Background section, a computing device may have multiple types of input devices, such as a keyboard, a mouse, a touch screen, etc. A touch instrument (e.g., also known as a stylus or pen) may be used with a touch screen. For example, a touch instrument enables a user to write or draw on a touch screen in the form of digital ink. The digital ink may be captured as digital data by a digitizer, enabling the digital ink to be used in various applications (e.g., converted to text, etc.). A touch instrument, unlike a keyboard or mouse, may provide feedback to users, e.g., haptic feedback. Haptic feedback may be time-sensitive, e.g., relative to an operation associated with the haptic feedback. A user may use one or more input devices, such as a stylus, to interact with the secure remote application(s). Using a stylus to interact with a secure Web-based application may lead to delays in haptic feedback and/or display updates. For example, there may be delays caused by sending inking data to a server to generate and transmit haptic feedback and to update touch input in displayed video for a user to see, hear, and/or feel. However, processing inking data locally may impact security, for example, if the operating system of the computing device is compromised, such as by malware, a virus, a keylogger, etc.

As such, methods, systems, and computer program products are provided for enabling a secured stylus. Secure inking may result in secured cloud notes. A secure connection may be established between a digitizer processor (e.g., microcontroller) in a computing device and a remote server providing virtual desktop infrastructure (VDI), which uses virtual machines to provide and manage virtual desktops (e.g., VDI hosts desktop environments on server(s) and deploys them to end-users on request). A user may connect a computing device to a remote computer while concealing stylus input and feedback from the device processor and operating system (OS). A digitizer interposer may be implemented in the computing device, the server, and/or between them. Raw digitizer input may be protected by encryption and/or by bypassing the OS and processor of a user computing device. Digitizer signal processing, normally performed by the OS, may be distributed among edge and cloud servers. For example, an edge digitizer interposer may generate and provide time-sensitive sensory feedback (e.g., haptic feedback to a stylus and/or display of temporary digital ink as a user creates the digital ink while a cloud server processes inking data to update video content for display by the user computing device in a secure area/window). A secure connection may be established between a graphics processing unit (GPU) and the remote server, protecting secure connection video generated by the server by encryption (e.g., digital rights management (DRM)) and/or bypassing the OS and processor of the user computing device.

For example, a digitizer interposer (e.g., internal or external to a computing device) may be configured to receive, from a digitizer processor in a computing device, inking data representative of touch screen operations performed in at least a secure region of a touch screen of the computing device that is displaying at least the secure region generated by a remote device (e.g., a server). Having the secure region as a designated screen area into which secure information may be input enables secure information to be provided at the computing device and passed securely to the remote device without being exposed on the computing device. For instance, even if the computing device itself has become insecure (e.g., hacked), the digitizer interposer keeps the secure information inaccessible to the OS and processor(s) of the computing device. The digitizer interposer may process the inking data, e.g., at least in part, to provide time-sensitive information to the digitizer processor (e.g., haptic feedback, temporary inking for display). The digitizer interposer may provide at least a portion of the inking data to the server, which may be configured to process the inking data and generate video data for display by the computing device representative of the touch screen operations performed in at least the secure region.

Embodiments may be configured in various ways in various embodiments. For instance, FIG. 1 shows a block diagram of an example system 100 for a secure stylus, in accordance with an example embodiment. As shown in FIG. 1, example system 100 includes a computing device 102, a stylus 130, an edge server 132, and/or a cloud (network-based) server 134. Computing device 102 includes a display unit 104, which includes a touch screen 106, digitizer processor 108, a graphics processing unit (GPU) 138, and in some embodiments, a digitizer interposer 116a. Touch screen 106 includes a digitizer sensor 110. Stylus 130 includes one or more electrodes 112, one or more transceivers 124, a processor 126, and a battery 128. Edge server 123 includes a digitizer interposer 116b in some embodiments. Cloud server 134 includes a a virtual desktop server 136, and in some embodiments includes a digitizer interposer 116c. These components of system 100 are described in further detail as follows.

Computing device 102 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing device 102 may include one or more applications, operating systems, virtual machines (VMs), storage devices, etc., that may be executed, hosted, and/or stored therein or via one or more other computing devices via network(s) (not shown). Computing device 102 may execute one or more processes in one or more computing environments. A process is any type of executable (e.g., binary, program, application) that is being executed by a computing device. A process may include an automated pairing process. A computing environment may be any computing environment (e.g., any combination of hardware, software, and firmware). An example computing device with example features is presented in FIG. 6.

Computing device 102 includes display unit 104 for displaying imagery to a user. Computing device (e.g., touch device) 102 may be configured to execute software applications that cause content to be displayed to users via display unit 104. Computing device 102 may also be configured to display content generated by remotely executed software applications. Computing device 102 may include GPU 138 configured to render video for display by display unit 104 securely (e.g., bypassing a central processing unit (CPU) and operating system (OS) associated with computing device 102).

Display unit 104 includes touch screen 106 as a display device and input device for user input (e.g., by touch and/or use of a stylus). Touch screen 106 may include an integrated touch interface (e.g., touch screen or touch pad) or a peripheral touch interface. Touch screen 106 includes a digitizer sensor 110, which may be implemented as an antenna array (e.g., a two-dimensional array of antenna elements/electrodes). Touch screen 106 may be utilized by users through interaction with touch instruments, such as stylus 130, e.g., to perform inking operations. Digitizer processor 108 (e.g., a touch controller (TC)) may process (e.g., at least in part) signals generated by digitizer sensor 110, e.g., in response to user interaction with touch screen 106. Software applications, regardless where executed, may respond to user touch input (e.g., inking operations).

Digitizer sensor 110 may detect touch-related operations with contact (e.g., zero (0) hover height) or without contact (e.g., hover height>0). Digitizer sensor 110 may detect interactions and communications (e.g., commands and/or information) associated with stylus 130. For example, digitizer sensor 110 may be configured to receive/transmit communication signals from/to stylus 130. Antennas (e.g., electrodes) in digitizer sensor 110 may detect energy (e.g., coupling and transmission energy) associated with operations using stylus 130. Digitizer sensor 110 may detect energy in a variety of forms and sources, such as wirelessly transmitted signals 120 conveying information (e.g., haptic parameters), electrostatic coupling 118, etc. Digitizer processor 108 may receive and process signals indicative of interactions and communications (e.g., commands and/or information) associated with stylus 130, for example, to determine when and/or where to implement inking operations, erasing operations, provide feedback, etc. Digitizer processor 108 may determine interactions and communications by processing energy detected by digitizer sensor 110.

In some examples, digitizer processor 108 may be configured to not process signals, encrypt the signals and provide them to digitizer interposer 116 (one of digitizers 116a, 116b, and 116c). In some examples, digitizer processor may be configured to perform full or partial processing of signals, providing encrypted or unencrypted partially or fully processed signals to digitizer interposer 116, e.g., depending on where digitizer interposer 116 is implemented. Digitizer processor 108 may selectively process, encrypt, and route signal information to digitizer interposer 116 or to an OS associated with computing device 102, for example, depending whether touch signals were generated in secure region 112 or unsecure region 114.

In some examples, digitizer interposer 108 may rely on the OS associated with computing device 102 to determine location of user input in secure region 112 or unsecure region 114. Digitizer processor 108 may switch between secure and unsecure modes for processing, encryption, routing, etc. based on the indication from the OS. A user may quickly detect if the OS is compromised. For example, since video for a secured window may be provided by digitizer interposer 116 (e.g., temporary ink) and virtual desktop service 136, if the OS is compromised and indicates an incorrect stylus input position to digitizer processor 108 to trick digitizer processor 108 to send stylus input in secure region 112 to the OS then the user will see that the video displayed in secure region 112 is not being updated to reflect user input, indicating that malware, virus, etc. has compromised the secured session. A physical indication may be provided to a user to indicate whether stylus 130 is being used in a secure or an insecure mode, such as feedback provided to stylus 130, e.g., by digitizer processor 108, digitizer interposer 116, etc. The indication may be, for example, a red light on a keyboard, a mouse, stylus 130, haptic feedback to stylus 130, an indication on display unit 104, LED(s) controlled only by digitizer processor 108 without input by OS, etc.

Digitizer processor 108 may include a processor (e.g., a microcontroller) configured to execute one or more security protocols. Digitizer processor 108 may be configured to execute, security software, such as enhanced layer 2 software (ELS) for a secure tunnel connection to a remote computing device. For example, edge server 132 and/or cloud server 134 may detect that digitizer processor 108 is a certified trusted device, e.g., if/when digitizer processor attempts to make a connection. Digitizer processor 108 may have a unique identifier (ID). Digitizer processor 108 may have a cryptographic key that may be used to test its ID in a secure way. Edge server 132 and/or cloud server 134 may detect the firmware, serial number, etc. for digitizer processor 108, e.g., to establish trust. Although not shown, a microcontroller for other input devices, such as a mouse and keyboard, may be implemented similar to digitizer processor 108. Digitizer processor 108 may be configured to encrypt and decrypt communications, e.g., with edge server 132 and/or cloud server 134 to support secure remote access/operation/interaction/display with pen/touch input/display.

A user may use stylus 130 to interact with touch screen 106 (e.g., while an image is displayed by display unit 104). Stylus 130 may be an active or passive device. As shown by example in FIG. 1, stylus 130 may be an active device. Examples of a stylus include, without limitation, a digital pen, a light pen, a wearable device for a user's finger, a glove, etc. Stylus 130 may be held and wielded by a user to interface with computing device 102 to perform functions such as selecting objects, writing/inking, shading (e.g., low force inking), erasing, and/or the like.

Stylus 130 includes a battery 128, a processor 126, transceiver(s) 124, and electrode(s) 122. Battery may power processor 126 and transceiver(s) 126, and/or charge electrode(s) 122. Processor 126 may execute one or more programs related to operations of stylus 130, such as communication (e.g., transmission and/or reception) of commands and/or information (e.g., inking parameters, haptic parameters) between stylus 130 and computing device 102. Processor 126 may send/receive communications through transceiver(s) 124.

Network(s) 140 may include, for example, one or more of any of a local area network (LAN), a wide area network (WAN), a personal area network (PAN), a combination of communication networks, such as the Internet, and/or a virtual network. In example implementations, computing device 102, edge server 132, and/or cloud server 134 may be communicatively coupled via network(s) 140. In an implementation, any one or more of computing device 102, edge server 132, and/or cloud server 134 may communicate via one or more application programming interfaces (APIs), and/or according to other interfaces and/or techniques. Computing device 102, edge server 132, and/or cloud server 134 may include one or more network interfaces that enable communications between devices. Examples of such a network interface, wired or wireless, may include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Edge server 132 may comprise one or more computing devices, servers, services, local processes, remote machines, web services, etc. at the edge of the cloud, e.g., nearer to computing device 102 than cloud server 134. Edge server 132 may be any type of stationary or mobile computing device. In an example, edge server 132 may comprise a server located on an organization's premises and/or coupled to an organization's local network, a remotely located (e.g., third party) server, a cloud-based server (e.g., one or more servers in a distributed manner), or any other device or service that may host, manage, and/or provide resource(s) for secured stylus operation. Edge server 132 may be implemented as a plurality of programs executed by one or more computing devices. Edge server 132 is not limited to physical machines, but may include other types of machines or nodes, such as a virtual machine, that are executed in physical machines.

Cloud server 134 may comprise one or more computing devices, servers, services, local processes, remote machines, web services, etc. Cloud server 134 may be any type of stationary or mobile computing device. In an example, cloud server 134 may comprise a remotely located (e.g., third party) server, a cloud-based server (e.g., one or more servers in a distributed manner), or any other device or service that may host, manage, and/or provide resource(s) for secured stylus operation. Cloud server 134 may be implemented as a plurality of programs executed by one or more computing devices. Cloud server 134 is not limited to physical machines, but may include other types of machines or nodes, such as a virtual machine, that are executed in physical machines.

Cloud server 134 may include virtual desktop service 136 (e.g., a virtual desktop infrastructure (VDI) service). Virtual desktop service 136 may host and provide computing device 102 remote access to a virtual service. A virtual service may be, for example, an application (e.g., software as a service), a virtual machine (VM) or a plurality of VMs, and/or the like. Computing device 102 (e.g., digitizer processor 108) may use a cryptographic element to establish a secure communication channel with virtual desktop service 136. For example, virtual desktop service 136 may provide access to the user's desktop computer while the user is traveling with or at home with computing device 102.

Virtual desktop service 136 may generate content (e.g., audio/video stream(s)), such as a visual output (e.g., an application, a console, a desktop environment) for display by display unit 104. The content generated by virtual desktop service 136 may include user input, e.g., generated by typing on a keyboard associated with computing device 102, by generating digital ink on digitizer sensor 110 (e.g., in secure region 112) using stylus 130, etc. Computing device 102 (e.g., digitizer processor 108) may associate secure region 112 on digitizer sensor 110 with content (e.g., a secure window) shown by display unit 104 generated by virtual desktop service 136. Unsecure region 114 of digitizer sensor 110 may be associated with content shown by display unit 104 generated by computing device 102. A user may use stylus 130 to select secure region 112 or unsecure region 114 to provide input. Digitizer processor 108 may selectively provide stylus input to the OS of computing device 102 (e.g., for input in unsecure region 114) or to virtual desktop service 136 (e.g., for input in secure region 112). Digitizer processor 108 may encrypt stylus (e.g., or other touch) input in secure region 112 using an encryption element. Computing device 102 (e.g., OS and CPU associated with computing device 102) may prepare and transmit the encrypted input to edge server 132 and/or cloud server 134, e.g., depending on the implementation.

Virtual desktop service 136 may encrypt content sent to computing device 102. Computing device 102 (e.g., GPU 138) may use the cryptographic element to decrypt encrypted content (e.g., audio/video stream(s)), such as a visual output (e.g., an application, a console, a desktop environment) generated by virtual desktop service 136. Computing device 102 (e.g., GPU 138) may overlay the decrypted video stream on other content displayed by display unit 104 (e.g., content generated by OS associated with computing device 102). Decrypted data generated by the cryptographic element may be inaccessible by the OS of computing device 102. Thus, even if computing device 102 is compromised, a malicious actor may be unable to view or otherwise access secure display data. A secure area used to display content generated by virtual desktop service 136 displayed by display unit 104 may be identified, by a visual indication (e.g., a colored border) around the outer edges of the decrypted video stream, creating a visual border between protected and non-protected visual content. Similarly, secure audio content may be decrypted using a cryptographic element, bypassing the OS associated with computing device 102. In some embodiments, content generated by virtual desktop service 136 may be encrypted using digital rights management (DRM) technology. The cryptographic element may be a DRM component that implements, for example, Microsoft® PlayReady®, Adobe® Primetime™, Apple® FairPlay® Streaming, Google® Widevine™, DivX®, Intertrust® Marlin, Veramatrix® Video Content Authority System (VCAS), and/or the like.

In some examples, a user may use one or more additional input devices (e.g., in addition to stylus 130 with touch screen 106), such as a keyboard, mouse, microphone, virtual reality headset, etc. Inputs from other devices may be similarly encrypted and communicated on the same or different secure channel. Multiple channels may be cryptographically associated with one another. In some examples, cryptographic association of channels may be accomplished using a common cryptographic credential. A cryptographic credential may be, for example, an encryption key (e.g., an attestation key, the public key of an asymmetric key pair), a signed identity, a certificate (e.g., an attestation certificate), and/or the like. Content generated by virtual desktop service 136 may reflect input from multiple input devices received on one or more secure channels.

Digitizer interposer 116 may be implemented between digitizer processor 108, GPU 138, and virtual desktop service 136. Digitizer interposer 116 may be located in full or in part (e.g., distributed) internal or external to computing device 102. Several examples are shown in FIG. 1. Digitizer interposer 116a is located, in part or in full, in computing device 102. Digitizer processor 108 may or may not encrypt information communicated to digitizer interposer 116a. When in computing device 102, digitizer interposer 116a may be configured to encrypt raw inking data received from digitizer processor 108 (rather than digitizer processor 108 being configured to do so). Digitizer interposer 116b is located, in part or in full, in edge server 132. Digitizer interposer 116c is located, in part or in full, in cloud server 134. Digitizer processor 108 may encrypt information communicated to digitizer interposer 116b or 116c. Digitizer interposers 116a, 116b, and 116c may be implemented in various ways, including in a separate semiconductor device package from other processors (e.g., digitizer processor 108, GPU 138, processor 610 of FIG. 6) such as in an integrated circuit chip, an FPGA (field programmable gate array), a system-on-chip (SOC), etc. In another embodiment, digitizer interposers 116*a*, 116*b*, and 116*c* may be implemented in a semiconductor device package with another processor. In some embodiments, having a digitizer interposer in edge server 132 or cloud server 134, rather than in computing device 102, may enable cost savings in computing device 102, with computing device 102 not being sold with an extra semiconductor device.

Digitizer interposer 116 may perform one or more of the signal processing operations that may otherwise be performed by the OS (e.g., if not for secure mode of operation), some of which may be time-sensitive, such as haptic feedback and displaying inking operations as they occur without undue latency. Digitizer interposer 116 may return user configuration and OS VM events from virtual desktop service 136 back to the digitizer processor 108.

Digitizer interposer 116 may interpose all or some digitizer traffic. Digitizer interposer 116 may be configured to define specific areas of interest in which digitizer interposer 116 should receive (e.g., raw) stylus reports. Digitizer interposer 116 may interpose all or some feedback (e.g., haptic feedback to stylus 130 based on haptic parameters/characteristics).

Interposed traffic may be communicated without encryption (e.g., over human interface device (HID)) if the traffic does not include confidential information, via an encrypted connection or via a dedicated connection (e.g., serial peripheral interface (SPI)) between digitizer processor 108 and digitizer interposer 116.

Communication between digitizer processor 108 and digitizer interposer 116 may occur over a dedicated or encrypted physical interface. Data communicated between digitizer processor 108 and digitizer interposer 116 may include, for example, raw stylus reports, sampled data, uplink data, haptics activation and characteristics, and/or Bluetooth low energy (BLE) pairing options.

Digitizer interposer 116 may send encrypted stylus location (e.g., determined by digitizer processor 108 or digitizer interposer 116) to virtual desktop service 136, which may complete processing, save and send processed stylus information to be presented in the virtual desktop infrastructure (VDI) output.

Digitizer interposer 116 may process the raw data received from digitizer processor 108. Digitizer processor 108 or digitizer interposer 116 may determine pen location (e.g., in secure region 112 or in unsecure region 114), for example, depending on the implementation of digitizer interposer 116*a*, 116*b*, or 116*c*.

Digitizer interposer 116 may receive, for example, OS-bypassed digitizer sensed output, which may or may not be processed (e.g., at least in part) by digitizer processor 108. In some examples, digitizer sensor 110 output may be partially processed by digitizer processor 108 and further processing may be performed by OS. However, for secure operation with virtual desktop service 136, processing by OS associated with computing device 102 may be avoided. Stylus 130 may be bidirectional, providing input to digitizer sensor 110 and receiving feedback (e.g., haptic feedback). Digitizer interposer 116 may perform at least partial processing of OS-bypassed digitizer output to avoid noticeable delay in display of digital inking by display unit 104 as user creates digital ink and/or may avoid noticeable delay in providing haptic feedback to stylus 130.

Digitizer interposer 116 may generate (e.g., based on raw data from digitizer processor 108) early presentation/prediction (e.g., temporary digital inking) and communicate the generated content for display by display unit 104, for example, to reduce latency (e.g., while waiting for streaming video update from virtual desktop service 136). Digitizer interposer 116 may (e.g., directly) render temporary ink using a secured video channel with GPU 138 and locally stored inking parameters (e.g., provided to digitizer interposer 116 by virtual desktop service 136). Digitizer interposer 116 may remove temporary drawn ink, for example, after a preconfigured timeout interval or after display unit 104 in prepared to display updated video generated by virtual desktop service 136 (e.g., in a following frame).

Operation of digitizer interposer 116 may be based on the operation (e.g., functional split) between digitizer processor 108 and/or virtual desktop service 136. For example, if digitizer processor 108 sends processed reports (e.g., instead of raw reports) to digitizer interposer 116, then digitizer interposer 116 may provide (e.g., only) time-sensitive operations, such as haptic feedback and/or temporary digital ink.

In some examples, a user may use one or more additional input devices (e.g., in addition to stylus 130 with touch screen 106), such as a keyboard, mouse, microphone, virtual reality headset, etc. Inputs from other devices may be similarly encrypted and communicated on the same or different secure channel. Multiple channels may be cryptographically associated with one another. In some examples, cryptographic association of channels may be accomplished using a common cryptographic credential. A cryptographic credential may be, for example, an encryption key (e.g., an attestation key, the public key of an asymmetric key pair), a signed identity, a certificate (e.g., an attestation certificate), and/or the like.

Virtual desktop service 136, which provides the application that the user interacts with in secure region 112, may have user settings and/or other configuration(s), such as inking parameters, haptic parameters, etc., that user may use stylus 130 or other input device to select or otherwise indicate. Virtual desktop service 136 may provide the user settings and/or other configuration(s) to digitizer interposer 116 so that digitizer interposer 116 may perform one or more (e.g., time-sensitive) operations, such as generating and communicating haptic feedback and/or generating and communicating temporary digital ink while virtual desktop service 136 updates a video stream with recent input. Digitizer interposer 116 may end temporary digital ink display, for example, as display unit 104 displays updated content received from virtual desktop service 136. Stylus 130 may have current use characteristics for digital ink (e.g., inking characteristics), such as line width, line color, shape, brush type, etc., which may need to be known by digitizer interposer 116 to accurately depict the digital ink on a display. Similarly, haptic characteristics/parameters may include, for example, pen ID, haptic gain, haptic waveform, haptic trigger command, etc., which digitizer interposer 116 may need to know to generate accurate haptic feedback. Virtual desktop service 136 may update inking, haptic, and/or other parameters if the application and/or user updates them (e.g., using an application user interface (UI).

Virtual desktop service 136 and/or digitizer interposer 116 may save the secure session context, e.g., in case of internet connection drop. A client application executed by computing device 102 (e.g., a Web browser application) may reconnect, e.g., re-establishing a secure connection between digitizer processor 108 and virtual desktop service 136, for example, unless the session key expired.

Figure 2:
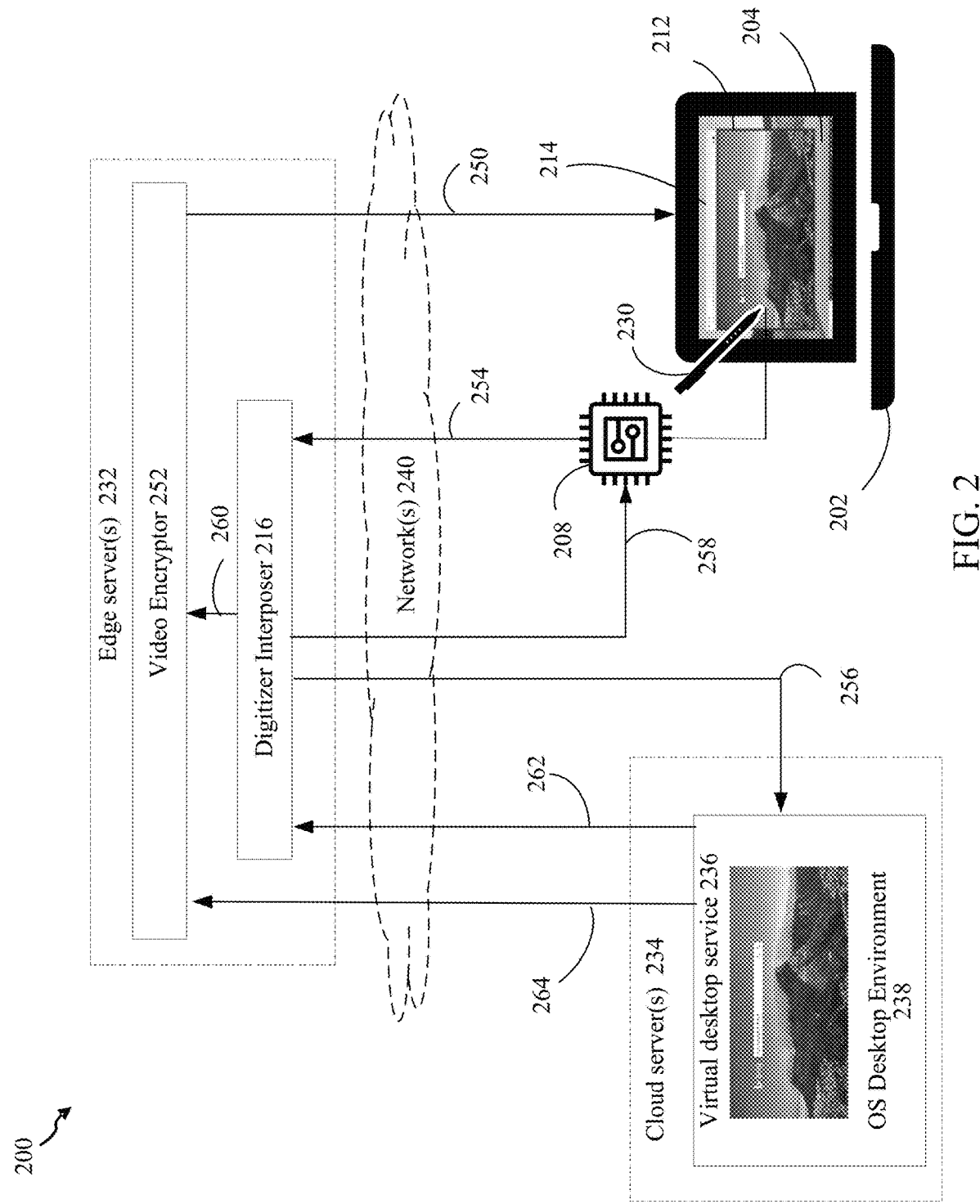
FIG. 2 shows a block diagram of an example system for a secure stylus with an external digitizer interposer, in accordance with an example embodiment.

FIG. 2 shows a block diagram of an example system 200 for a secure stylus with an external digitizer interposer, in accordance with an example embodiment. FIG. 2 shows one of many example implementations of a secured stylus system 200. As shown in FIG. 2, example secured stylus system 200 may include a computing device 202, a stylus 230, one or more edge servers 232 and/or one or more cloud servers 234. These components of example secured stylus system 200 are described in further detail as follows.

Computing device 202 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing device 102 may include one or more applications, operating systems, virtual machines (VMs), storage devices, etc., that may be executed, hosted, and/or stored therein or via one or more other computing devices via network(s) (not shown). Computing device 102 may execute one or more processes in one or more computing environments. A process is any type of executable (e.g., binary, program, application) that is being executed by a computing device. A process may include an automated pairing process. A computing environment may be any computing environment (e.g., any combination of hardware, software, and firmware). An example computing device with example features is presented in FIG. 6.

Computing device 202 includes touch screen display 204 for displaying imagery to a user. Computing device (e.g., a touch device) 202 may be configured to execute software applications that cause content to be displayed to users via touch screen display 204. Computing device 202 may also be configured to display content generated by remotely executed software applications. Computing device 202 may include a GPU (e.g., GPU 138 of FIG. 1) configured to render video for display by touch screen display 204 securely (e.g., bypassing a central processing unit (CPU) and operating system (OS) associated with computing device 202).

Touch screen display 204 includes a touch screen, which may include an integrated touch interface (e.g., touch screen or touch pad) or a peripheral touch interface. The touch interface may include a sensor array, which may be implemented as an antenna array (e.g., a two-dimensional array of antenna elements/electrodes). The touch screen may be utilized by users through interaction with touch instruments, such as stylus 230, e.g., to perform inking operations. Digitizer 208 may include a digitizer processor (e.g., a touch controller (TC)), which may process signals generated by the sensor array, e.g., in response to user interaction with touch screen display 204. Software applications, regardless of where executed, may respond to user touch input (e.g., inking operations).

Digitizer 208 may detect (e.g., via the sensor array) touch-related operations with contact (e.g., zero (0) hover height) or without contact (e.g., hover height>0). Digitizer 208 may detect interactions and communications (e.g., commands and/or information) associated with stylus 230. For example, digitizer 208 may be configured to receive/transmit communication signals from/to stylus 230. Antennas (e.g., electrodes) in the sensor array may detect energy (e.g., coupling and transmission energy) associated with operations using stylus 230. Digitizer 208 may detect energy in a variety of forms and sources, such as wirelessly transmitted signals conveying information (e.g., haptic parameters), electrostatic coupling, etc. Digitizer 208 may receive and process interactions and communications (e.g., commands and/or information) associated with stylus 230, for example, to determine when and/or where to implement inking operations, erasing operations, provide feedback, etc. Digitizer 208 may determine interactions and communications by processing energy detected by digitizer 208.

Digitizer 208 may include a processor (e.g., a microcontroller) configured to execute one or more security protocols. Digitizer 208 may be configured to execute security software, such as enhanced layer 2 software (ELS) for a secure tunnel connection to a remote computing device. For example, edge server(s) 232 and/or cloud server 234 may detect that digitizer 208 is a certified trusted device, e.g., if/when digitizer processor attempts to make a connection. Digitizer 208 may have a unique identifier (ID). Digitizer 208 may have a cryptographic key that may be used to test its ID in a secure way. Edge server(s) 232 and/or cloud server 234 may detect the firmware, serial number, etc. for digitizer 208, e.g., to establish trust. Although not shown, a microcontroller for other input devices, such as a mouse and keyboard, and/or a GPU associated with computing device 202 may be implemented similar to digitizer 208. Digitizer 208 may be configured to encrypt and decrypt communications, e.g., with edge server(s) 232 and/or cloud server 234 to support secure remote access/operation/interaction/display with pen/touch input/display.

A user may use stylus 230 to interact with touch screen display 204 (e.g., while an image is displayed). Stylus 230 may be an active or passive device. Examples of stylus 230 include, without limitation, a digital pen, a light pen, a wearable device for a user's finger, a glove, etc. Stylus 230 may be held and wielded by a user to interface with computing device 202 to perform functions such as selecting objects, writing/inking, shading (e.g., low force inking), erasing, and/or the like.

Stylus 230 includes a battery, a processor, transceiver(s), and electrode(s). The battery may power the processor and transceiver(s) and/or charge the electrode(s). The processor may execute one or more programs related to operations of stylus 230, such as communication (e.g., transmission and/or reception) of commands and/or information (e.g., inking parameters, haptic parameters) between stylus 230 and computing device 202. The processor may send/receive communications through the transceiver(s).

Network(s) 240 may include, for example, one or more of any of a local area network (LAN), a wide area network (WAN), a personal area network (PAN), a combination of communication networks, such as the Internet, and/or a virtual network. In example implementations, computing device 202, edge server(s) 232, and/or cloud server 234 may be communicatively coupled via network(s) 240. In an implementation, any one or more of computing device 202, edge server(s) 232, and/or cloud server 234 may communicate via one or more application programming interfaces (APIs), and/or according to other interfaces and/or techniques. Computing device 202, edge server(s) 232, and/or cloud server 234 may include one or more network interfaces that enable communications between devices. Examples of such a network interface, wired or wireless, may include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Edge server(s) 232 may comprise one or more computing devices, servers, services, local processes, remote machines, web services, etc. at the edge of the cloud, e.g., nearer to computing device 202 than cloud server 234. Edge server(s) 232 may be any type of stationary or mobile computing device. In an example, edge server(s) 232 may comprise a server located on an organization's premises and/or coupled to an organization's local network, a remotely located (e.g., third party) server, a cloud-based server (e.g., one or more servers in a distributed manner), or any other device or service that may host, manage, and/or provide resource(s) for secured stylus operation. Edge server(s) 232 may be implemented as a plurality of programs executed by one or more computing devices. Edge server 232 is not limited to physical machines, but may include other types of machines or nodes, such as a virtual machine, that are executed in physical machines.

Edge server(s) 232 may include a digitizer interposer 216 and a video encryptor 252. Digitizer interposer 216 may receive OS-bypassed encrypted stylus signals (e.g., reports) from digitizer 208. Digitizer interposer 216 may decrypt OS-bypassed encrypted stylus signals from digitizer 208 to at least partially process OS-bypassed stylus signals, for example, to generate temporary digital ink 260 based on inking parameters 262 for display by touch screen display 204 (e.g., after GPU decryption and processing) and/or to generate haptic feedback for stylus 230. Inking parameters 262 may include, for example, pen ID, haptic gain, wave, trigger, pressure curve, etc. Locally stored inking parameters 262 enable the locally generated temporary digital ink 260 to be generated in accordance with preferences set by user selection and/or by the cloud server, and consistent with the preferences applied to the content generated by virtual desktop service 236.

Digitizer interposer 216 may interpose all or some digitizer traffic. Digitizer interposer 216 may be configured to define specific areas of interest in which digitizer interposer 216 should receive (e.g., raw) stylus reports. Digitizer interposer 216 may interpose all or some feedback (e.g., haptic feedback to stylus 230 based on haptic parameters/characteristics).

Communication between digitizer interposer 216 and digitizer 208 may occur over a dedicated or encrypted physical interface. Interposed traffic may be communicated without encryption (e.g., over human interface device (HID)) if the traffic does not include confidential information, via an encrypted connection or via a dedicated connection (e.g., serial peripheral interface (SPI)) between digitizer 208 and digitizer interposer 216. Data communicated between digitizer 208 and digitizer interposer 216 may include, for example, raw stylus reports, sampled data, uplink data, haptics activation and characteristics, and/or Bluetooth low energy (BLE) pairing options.

Digitizer interposer 216 may send encrypted stylus location to virtual desktop service 236 in stylus data 256. Virtual desktop service 236 may complete processing, save and send processed stylus information for video encryption via RDP connection 264.

Digitizer interposer 216 may provide haptic information 258 to digitizer 208. Haptic information 258 may include haptic parameters and haptic feedback. Digitizer interposer 216 may use haptic parameters to generate haptic feedback in response to processing OS-bypassed encrypted stylus signals 254. Digitizer interposer 216 may provide haptic feedback to digitizer 208, which may provide the haptic feedback to stylus 230. Haptic parameters may be haptic settings that a user of stylus 230 selects, such as in a stylus settings menu accessed in the OS desktop environment 238 (e.g., Microsoft® Windows® VM desktop environment, etc.) displayed in secure region 212. A setting menu may allow user selection of haptic parameters, such as gain, vibration type, pen, pencil, eraser, pen, and/or other settings. There may be multiple ways to communicate haptic settings to stylus 230. OS desktop environment 238 may relay/communicate haptic settings/parameters to stylus 230 through cloud server(s) 234, edge server(s) 232, and digitizer 208. Digitizer 208 may convey haptic information 258 to stylus 230, for examples, using wireless communication, such as Bluetooth, or over the uplink electrostatic channel from digitizer 208 to stylus 230, which may be implemented without access by the OS associated with computing device 202.

Digitizer interposer 216 may generate early presentation/prediction (e.g., temporary digital ink 260) and communicate the generated content for display by touch screen display 204, for example, to reduce latency (e.g., while waiting for streaming video update from virtual desktop service 236). Digitizer interposer 216 may (e.g., directly) render temporary digital ink 260 using a secured video channel (e.g., to a GPU associated with computing device 202) and locally stored inking parameters 262. Digitizer interposer 216 may remove temporary drawn ink, for example, after a preconfigured timeout interval or after touch screen display 204 becomes prepared to display updated video generated by virtual desktop service 236 (e.g., in a following frame).

Cloud server 234 may comprise one or more computing devices, servers, services, local processes, remote machines, web services, etc. Cloud server 234 may be any type of stationary or mobile computing device. In an example, cloud server 234 may comprise a remotely located (e.g., third party) server, a cloud-based server (e.g., one or more servers in a distributed manner), or any other device or service that may host, manage, and/or provide resource(s) for secured stylus operation. Cloud server 234 may be implemented as a plurality of programs executed by one or more computing devices. Cloud server 234 is not limited to physical machines, but may include other types of machines or nodes, such as one or more virtual machines, that are executed in physical machines.

Cloud server 234 may include virtual desktop service 236 (e.g., a virtual desktop infrastructure (VDI) service). Virtual desktop service 236 may host and provide computing device 102 remote access to a virtual service. A virtual service may be, for example, an application (e.g., software as a service), a virtual machine (VM) or a plurality of VMs, and/or the like. Computing device 202 (e.g., digitizer 208) may use a cryptographic element to establish a secure communication channel with virtual desktop service 236. For example, virtual desktop service 236 may provide access to the user's desktop computer while the user is traveling with or at home with computing device 202.

Cloud server(s) 234 may have one or more connections (e.g., secure or unsecure connections) with edge server(s) 232. For example, cloud server(s) 234 may have a remote desktop protocol (RDP) connection 264 with edge server(s) 232, e.g., for video encryption by video encryptor 252 of content generated by virtual desktop service 236. Cloud server(s) 234 may (e.g., on the one or more connections) receive stylus data 256 from edge server(s) 232 (e.g., digitizer interposer 216). Stylus data 256 may include stylus location information (e.g., determined by digitizer 208 or digitizer interposer 216). Virtual desktop service 236 may process stylus data 256 to incorporate user input into content generated by virtual desktop service 236. Cloud server(s) 234 may (e.g., on the one or more connections) provide inking parameters 262 for stylus 230 to edge server(s) 232, e.g., for digitizer interposer 216 to generate temporary ink and/or otherwise process OS-bypassed encrypted stylus signals 254.

Virtual desktop service 236 may generate content (e.g., audio/video stream(s)), such as a visual output (e.g., an application, a console, a desktop environment) for display by display unit 204. As shown in FIG. 2, virtual desktop service 236 uses virtual machines to provide and manage virtual desktops. Virtual desktop service 236 may host desktop environments (e.g., OS desktop environment 238) and deploy them to end-users (e.g., computing device 202) on request. Secure region (e.g., secure window) 232 shown by touch screen display 204 displays OS desktop environment 238.

Content generated by virtual desktop service 236 may include user input, e.g., generated by typing on a keyboard associated with computing device 202, by generating digital ink on touch screen display 204 (e.g., in secure region 212) using stylus 230, etc. Computing device 202 (e.g., digitizer 208) may associate a secure region on touch screen display 204 with content (e.g., secure region/window 212) shown by display unit 204 generated by virtual desktop service 236. Unsecure region 214 of touch screen display 204 may be associated with content shown by display unit 204 generated by computing device 202. A user may use stylus 230 to select secure region 212 or unsecure region 214 to provide input. Digitizer 208 may selectively provide stylus input to the OS of computing device 202 (e.g., for input in unsecure region 214) or to digitizer interposer 216 (e.g., for input in secure region 212). Digitizer 208 may encrypt stylus (e.g., or other touch) input in secure region 212 using an encryption element. Computing device 202 (e.g., OS and CPU associated with computing device 202) may prepare and transmit the encrypted input to edge server 232.

Virtual desktop service 236 or edge server(s) 232 may encrypt content sent to computing device 202 (e.g., DRM protected video 250). Computing device 202 (e.g., GPU 138 of FIG. 1) may use a cryptographic element to decrypt encrypted content (e.g., encrypted OS desktop environment 238) generated by virtual desktop service 236. Computing device 202 (e.g., GPU 138 of FIG. 1) may overlay the decrypted video stream (e.g., as secure region 212) on other content (e.g., unsecure region 214 generated by OS associated with computing device 102) displayed by touch screen display 204. Decrypted data generated by the cryptographic element may be inaccessible by the OS of computing device 202. Thus, even if computing device 202 is compromised, a malicious actor may be unable to view or otherwise access secure display data. Secure region 212 used to display content generated by virtual desktop service 236 displayed by touch screen display 204 may be identified, by a visual indication (e.g., a colored border) around the outer edges of the decrypted video stream, creating a visual border between protected visual content (e.g., secure region 212) and non-protected visual content (e.g., unsecure region 214). Similarly, secure audio content may be decrypted using a cryptographic element, bypassing the OS associated with computing device 202. In some embodiments, content generated by virtual desktop service 236 may be encrypted using digital rights management (DRM) technology (e.g., DRM protected video 250). The cryptographic element may be a DRM component that implements DRM technology as mentioned elsewhere herein or otherwise known.

In some examples, a user may use one or more additional input devices (e.g., in addition to stylus 230 with touch screen display 204), such as a keyboard, mouse, microphone, virtual reality headset, etc. Inputs from other devices may be similarly encrypted and communicated on the same or different secure channel, e.g., with a microcontroller for the input(s). Multiple channels may be cryptographically associated with one another. In some examples, cryptographic association of channels may be accomplished using a common cryptographic credential. A cryptographic credential may be, for example, an encryption key (e.g., an attestation key, the public key of an asymmetric key pair), a signed identity, a certificate (e.g., an attestation certificate), and/or the like. Content generated by virtual desktop service 236 (e.g., OS desktop environment 238) may reflect input from multiple input devices, e.g., including input from stylus 230 to touch screen display 204, received on one or more secure channels.

Digitizer interposer 216 may be implemented between digitizer 208 and virtual desktop service 236. Digitizer interposer 216 may be located in full or in part (e.g., distributed) internal or external to computing device 202. Digitizer interposer 216 is located, in part or in full, in edge server(s) 232. Digitizer 208 may encrypt information communicated to digitizer interposer 216, as indicated by OS-bypassed encrypted stylus signals 254.

Digitizer interposer 216 may receive, for example, OS-bypassed encrypted stylus signals 254, which may or may not be processed (e.g., at least in part) by digitizer 208. In some examples, digitizer 208 may process (e.g., at least in part) signals generated by touch screen display 204. The OS associated with computing device 202 may complete processing of the signals (e.g., touch reports) for input detected in unsecure region 214. Digitizer interposer 216 and virtual desktop service 236 may complete processing for input detected in secure region 212. Digitizer interposer 216 may (e.g., at least partially) process the raw data received from digitizer 208. Digitizer interposer 216 may, for example, determine stylus location (e.g., in secure region 212), generate haptic feedback, and/or generate temporary digital ink. Stylus 230 may be bidirectional, providing input to touch screen display 204 and receiving feedback (e.g., haptic feedback). Digitizer interposer 216 may perform touch signal processing (e.g., at least in part), for example, to avoid noticeable delay in display of digital inking as user creates digital ink in secure region 212 and/or to avoid noticeable delay in providing haptic feedback to stylus 230.

In some examples, a user may use one or more additional input devices (e.g., in addition to stylus 230 with touch screen display 204), such as a keyboard, mouse, microphone, virtual reality headset, etc. Inputs from other devices may be similarly encrypted and communicated on the same or different secure channel. Multiple channels may be cryptographically associated with one another. In some examples, cryptographic association of channels may be accomplished using a common cryptographic credential. A cryptographic credential may be, for example, an encryption key (e.g., an attestation key, the public key of an asymmetric key pair), a signed identity, a certificate (e.g., an attestation certificate), and/or the like.

Virtual desktop service 236, which provides the application that the user interacts with in secure region 212 (e.g., OS desktop environment 238), may have user settings and/or other configuration(s), such as inking parameters, haptic parameters, etc., that user may use stylus 230 or other input device to select or otherwise indicate. Virtual desktop service 236 may provide the user settings and/or other configuration(s) to digitizer interposer 216 so that digitizer interposer 216 may perform one or more (e.g., time-sensitive) operations, such as generating and communicating haptic feedback and/or generating and communicating temporary digital ink while virtual desktop service 236 updates a video stream with recent input via RDP connection 264. Digitizer interposer 216 may end temporary digital ink display, for example, as touch screen display 204 displays updated content received from virtual desktop service 236 (e.g., DRM protected video 250 decrypted by the GPU). Stylus 230 may have current use characteristics for digital ink (e.g., inking characteristics), such as line width, line color, shape, brush type, etc., which may need to be known by digitizer interposer 216 to accurately depict the digital ink mixed with video generated by virtual desktop service 236. Similarly, haptic characteristics/parameters may include, for example, pen ID, haptic gain, haptic waveform, haptic trigger command, etc., which digitizer interposer 216 may use to generate accurate haptic feedback. Virtual desktop service 236 may update inking, haptic, and/or other parameters if the application and/or user updates them (e.g., using a user interface (UI) provided by the version of OS desktop environment 238 displayed in secure region 212).

Virtual desktop service 236 and/or digitizer interposer 216 may save the secure session context, e.g., in case of internet connection drop. A client application executed by computing device 202 (e.g., a Web browser application) may reconnect, e.g., re-establishing a secure connection with digitizer 208 and virtual desktop service 236, for example, unless the session key expired.

Figure 3:
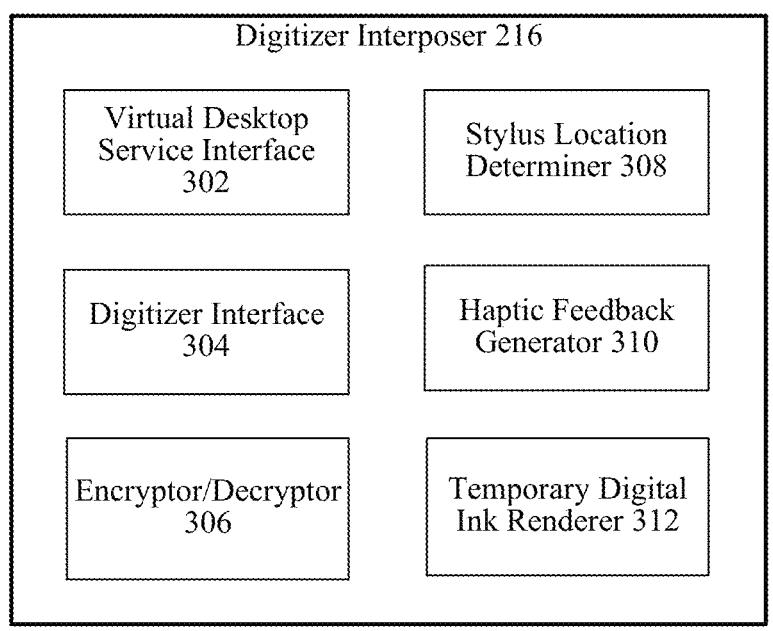
FIG. 3 shows a block diagram of an example of a digitizer interposer, in accordance with an embodiment.

FIG. 3 shows a block diagram of an example of a digitizer interposer, in accordance with an embodiment. FIG. 3 shows one of many example implementations of a digitizer interposer. As shown in FIG. 3, example digitizer interposer 216 may include virtual desktop service interface 302, digitizer interface 304, encryptor/decryptor 306, stylus location determiner 308, haptic feedback generator 310, and temporary digital ink renderer 312.

Virtual desktop service interface 302 may provide an interface for communication between digitizer interposer 216 and virtual desktop service 236. The communication connection between digitizer interposer 216 and virtual desktop service 236 may be an encrypted connection or a dedicated connection (e.g., serial peripheral interface (SPI)). For example, virtual desktop service interface 302 may send stylus data 256 from digitizer interposer 216 to virtual desktop service 236. Virtual desktop service interface 302 may receive inking parameters 262 from virtual desktop service 236.

Digitizer interface 304 may provide an interface for communication between digitizer interposer 216 and digitizer 208. The communication connection between digitizer interposer 216 and digitizer 208 may be an encrypted connection or a dedicated connection (e.g., serial peripheral interface (SPI)). For example, digitizer interface 304 may receive OS-bypassed encrypted stylus signals 254 from digitizer 208. Digitizer interface 304 may send haptic information 258 to digitizer 208. Digitizer interface 304 may provide all or a portion of OS-bypassed encrypted stylus signals 254 to virtual desktop service interface 302 to communicate to virtual desktop service 236 in stylus data 256.

Encryptor/decryptor 306 may perform decryption for communications received from digitizer 208 and virtual desktop service 236 and encryption for communications sent to digitizer 208 and virtual desktop service 236. For example, encryptor/decryptor 306 may decrypt OS-bypassed encrypted stylus signals 254 to provide stylus input data for processing by digitizer interposer 216. Encryptor/decryptor 306 may encrypt haptic information 258 provided to digitizer 208. Encryptor/decryptor 306 may encrypt stylus data 256 provided to virtual desktop service 236. Encryptor/decryptor 306 may decrypt inking parameters 262 received from virtual desktop service 236.

Stylus location determiner 308 may (e.g., at least partially) process OS-bypassed encrypted stylus signals 254 received from digitizer 208 and decrypted by encryptor/decryptor 306. Stylus location determiner 308 may determine the location of stylus 230 based on stylus input data (e.g., in secure region 212). Stylus location determiner 308 may provide the stylus location data to virtual desktop service interface 302 to communicate to virtual desktop service 236 in stylus data 256.

Haptic feedback generator 310 may (e.g., at least partially) process OS-bypassed encrypted stylus signals 254 received from digitizer 208 and decrypted by encryptor/decryptor 306. Haptic feedback generator 310 may determine haptic feedback based on stylus input data (e.g., in secure region 212). Haptic feedback generator 310 may provide the haptic feedback to digitizer interface 304 to communicate to digitizer 208 in haptic information 258.

Temporary digital ink renderer 312 may (e.g., at least partially) process OS-bypassed encrypted stylus signals 254 received from digitizer 208 and decrypted by encryptor/decryptor 306. Temporary digital ink renderer 312 may determine digital ink based on stylus input data (e.g., in secure region 212). Temporary digital ink renderer 312 may render and provide temporary digital ink 260 to video encryptor 252 for generation of DRM protected video 252, which may be provided to a GPU associated with computing device 202 for decryption and temporary rendering on touch screen display 204.

Figure 4A:
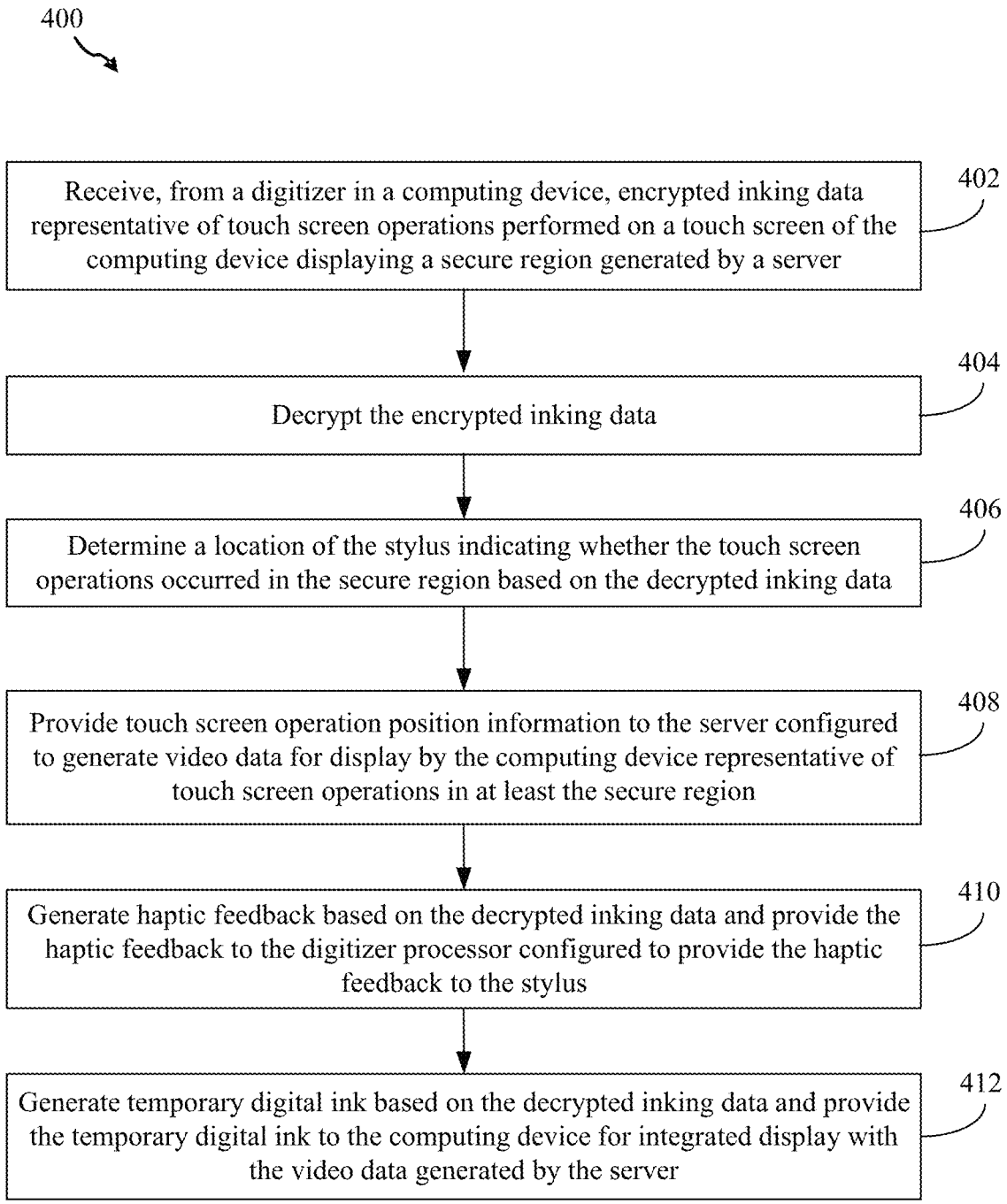
FIG. 4A shows a flowchart of a process for implementing a secure stylus, in accordance with an embodiment.

FIG. 4A shows a flowchart 400 of a process for calculating noise energy boundary determination parameters, in accordance with an embodiment. FIG. 4A shows a flowchart of a process for implementing a secure stylus, in accordance with an embodiment. Digitizer interposer 116, as shown by examples in FIGS. 1-3, may operate according to flowchart 400, e.g., in some embodiments. For example, example flowchart 400 may be implemented by digitizer interposer 116b. Various embodiments may implement one or more steps shown in FIG. 4A with additional and/or alternative steps. Further structural and operational embodiments will be apparent to persons skilled in the relevant art(s) based on the following description of FIG. 4A.

Flowchart 400 includes step 402. In step 402, encrypted inking data may be received, e.g., from a digitizer in a computing device. The encrypted inking data may be representative of touch screen operations performed on a touch screen of the computing device displaying a secure region generated by a server. For example, as shown in FIGS. 1 and 2, digitizer interposer 116b, 116c, 216 may receive encrypted inking data from digitizer processor 108, 208. The encrypted inking data may represent digital ink created by a user using stylus 130, 230 in secure region 112, 212 of touch screen 106, 206.

In step 404, the encrypted inking data may be decrypted. For example, as shown in FIGS. 1-3, digitizer interposer 116b, 116c, 216 (e.g., encryptor/decryptor 306) may decrypt the encrypted inking data received from digitizer processor 108, 208.

In step 406, a location of the stylus may be determined. The stylus location may indicate whether the touch screen operations occurred in the secure region based on the decrypted inking data. For example, as shown in FIGS. 1-3, digitizer interposer 116a. 116b, 116c. 216 (e.g., stylus location determiner 308) may determine the location of stylus relative to secure region 112, 212 and/or insecure region 114, 214 based on the decrypted inking data (e.g., stylus signals 254). Thus, determination of the stylus location in a secure region enables information entered via inking to be maintained secure from the OS and processor(s) of the computing device 102, which may be of particular importance if computing device 102 is compromised (e.g., hacked, etc.), while enabling the inking information to be provided to the cloud server for usage/processing.

In step 408, touch screen operation position information may be provided to the server configured to generate video data for display by the computing device representative of touch screen operations in at least the secure region. For example, as shown in FIGS. 1-3, digitizer interposer 116a, 116b, 116c. 216 (e.g., stylus location determiner 308) may provide the stylus location/position information to virtual desktop service 136, 236, which generates video including touch screen operations in the secure region and provides the video to video encryptor 252, which generates DRM protected video 250 for display in secure region 212 by touch screen display 204.

In step 410, haptic feedback may be generated based on the decrypted inking data. The haptic feedback may be provided to the digitizer processor configured to provide the haptic feedback to the stylus. For example, as shown in FIGS. 1-3, digitizer interposer 116a, 116b, 116c, 216 (e.g., haptic feedback generator 310) may generate haptic feedback and provide the haptic feedback (e.g., haptic information 258) to digitizer 108, 208, which is configured to provide the haptic feedback to stylus 130, 230.

In step 412, temporary digital ink may be generated based on the decrypted inking data and providing the temporary digital ink to the computing device for integrated display with the video data generated by the server. For example, as shown in FIGS. 1-3, digitizer interposer 116a, 116b, 116c, 216 (e.g., temporary digital ink renderer 312) may generate temporary digital ink and provide the temporary digital ink (e.g., temporary digital ink 260) to computing device 102, 202, for example, through video encryptor 252 as DRM protected video 250 blended with video provided by virtual desktop service 236 through RDP connection 264.

Figure 4B:
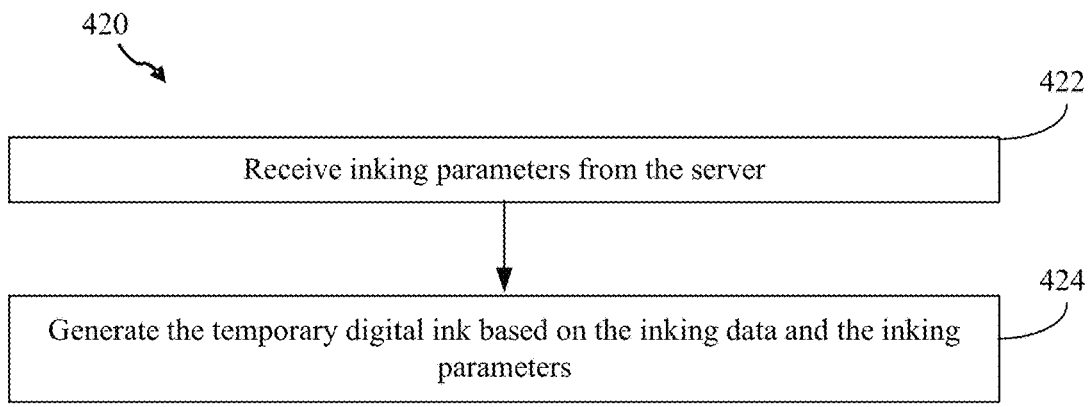
FIG. 4B shows a flowchart of a process for configuring inking parameters for temporary digital ink generation, according to an embodiment.

FIG. 4B shows a flowchart 420 of a process for configuring inking parameters for temporary digital ink generation, according to an embodiment. Step 412 of flowchart 420 of FIG. 4A may operate according to flowchart 420 in some embodiments. Further structural and operational embodiments will be apparent to persons skilled in the relevant art(s) based on the following description of FIG. 4B.

Flowchart 420 includes step 422. In step 422, inking parameters are received from the server. For example, as shown in FIG. 2, digitizer interposer 216 (e.g., virtual desktop service interface 302 of FIG. 3) may receive inking parameters 262 from virtual desktop service 236. As described above, digitizer interposers 116a, 116b, 116c, 216 (FIGS. 1 and 2) may be located in computing device 102, edge server 132, or cloud server 134, where inking parameters 262 are received.

In step 424, the temporary digital ink is generated based on the inking data and the inking parameters. For example, as shown in FIGS. 1-3, digitizer interposers 116a, 116b, 116c, 216 (e.g., temporary digital ink renderer 312 of FIG. 3) may generate temporary digital ink and provide the temporary digital ink (e.g., temporary digital ink 260) to corresponding computing devices 102, 202.

Figure 4C:
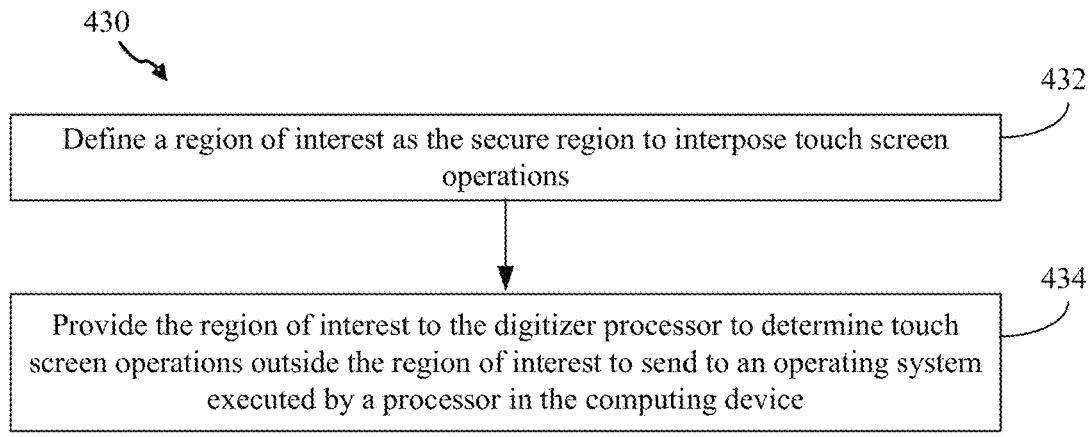
FIG. 4C shows a flowchart of a process for configuring a region of interest for secure inking, according to an embodiment.

FIG. 4C shows a flowchart 430 of a process for configuring a region of interest for secure inking, according to an embodiment. Digitizer interposer 116, as shown by examples in FIGS. 1-3, may operate according to flowchart 430 in some embodiments. Further structural and operational embodiments will be apparent to persons skilled in the relevant art(s) based on the following description of FIG. 4C.

Flowchart 430 includes step 432. In step 432, a region of interest is defined as the secure region to interpose touch screen operations. In an embodiment, a secure region, such as secure region 112 of FIG. 1, may be designated as a region of interest for entry of secure inking. Secure region 112 may be defined in various ways, such as by an application, a user, or other mechanism that defines one or more of a shape, a size, and/or a location of secure region 112 in touch screen 106. Enabling definition of secure region 112 according to step 432 enables the region to be compatible with user usage and/or to be dynamically adjusted over time based on detected user usage.

In step 434, the region of interest is provided to the digitizer processor to determine touch screen operations outside the region of interest to send to an operating system executed by a processor in the computing device. In an embodiment, digitizer processor 108 may receive the definition of secure region 112 and associate secure region 112 on digitizer sensor 110 with content shown by display unit 104 generated by virtual desktop service 136. Unsecure region 114 (e.g., the remainder of the display screen outside of secure region 112) of digitizer sensor 110 may be associated with content shown by display unit 104 generated by computing device 102. A user may use stylus 130 to select secure region 112 or unsecure region 114 to provide input.

Figure 5:
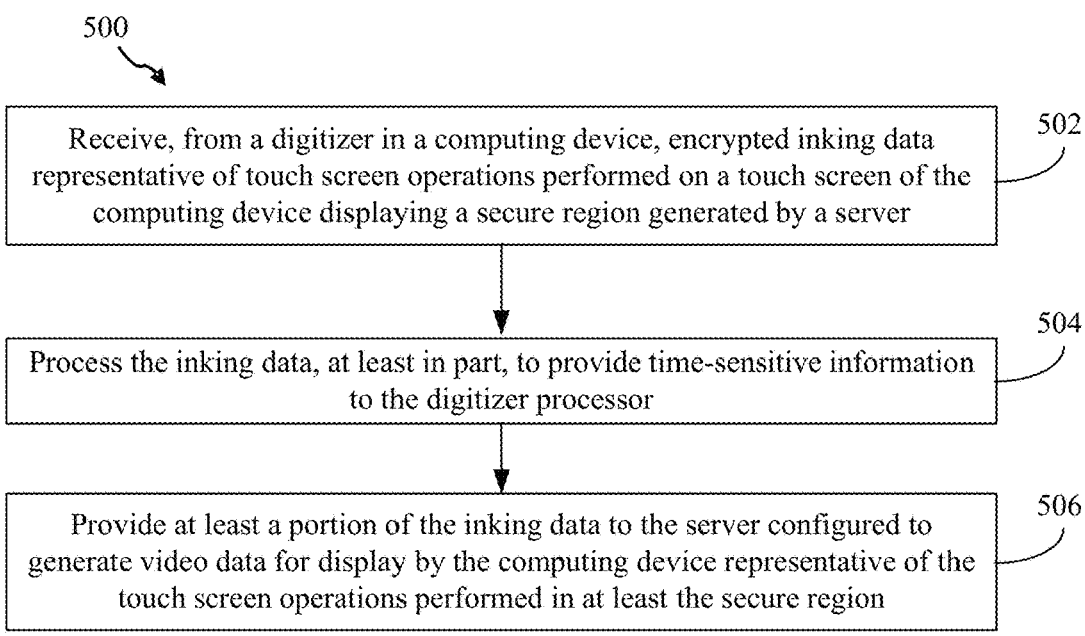
FIG. 5 shows a flowchart of a process for implementing a secure stylus, in accordance with an embodiment.

FIG. 5 shows a flowchart 500 of a process for calculating noise energy boundary determination parameters, in accordance with an embodiment. FIG. 5 shows a flowchart of a process for implementing a secure stylus, in accordance with an embodiment. Digitizer interposer 116, as shown by examples in FIGS. 1-3, may operate according to flowchart 500, e.g., in some embodiments. For example, example flowchart 500 may be implemented by digitizer interposer 116b. Various embodiments may implement one or more steps shown in FIG. 5 with additional and/or alternative steps. Further structural and operational embodiments will be apparent to persons skilled in the relevant art(s) based on the following description of FIG. 5.

Flowchart 500 includes step 502. In step 502, unencrypted or encrypted inking data may be received, e.g., from a digitizer in a computing device. The inking data may be representative of touch screen operations performed on a touch screen of the computing device displaying a secure region generated by a server. For example, as shown in FIGS. 1 and 2, digitizer interposer 116a in computing device 102 with digitizer processor 108 may receive unencrypted inking data from digitizer processor 108 while digitizer interposer 116b, 116c. 216 may receive encrypted inking data from digitizer processor 108, 208. The inking data may represent digital ink created by a user using stylus 130, 230 in secure region 112, 212 of touch screen 106, 206.

In step 504, the inking data may be processed, at least in part, to provide time-sensitive information to the digitizer processor (e.g., haptic feedback for stylus and/or temporary digital ink for display). For example, as shown in FIGS. 1-3, digitizer interposer 116a. 116b, 116c, 216 (e.g., haptic feedback generator 310) may generate haptic feedback and provide the haptic feedback (e.g., haptic information 258) to digitizer 108, 208, which is configured to provide the haptic feedback to stylus 130, 230. For example, as shown in FIGS. 1-3, digitizer interposer 116a, 116b, 116c, 216 (e.g., temporary digital ink renderer 312) may generate temporary digital ink and provide the temporary digital ink (e.g., temporary digital ink 260) to computing device 102, 202, for example, through video encryptor 252 as DRM protected video 250 blended with video provided by virtual desktop service 236 through RDP connection 264.

In step 506, at least a portion of the inking data may be provided to the server configured to generate video data for display by the computing device representative of the touch screen operations performed in at least the secure region. For example, as shown in FIGS. 1-3, digitizer interposer 116a, 116b, 116c, 216 (e.g., stylus location determiner 308) may provide the stylus location/position information to virtual desktop service 136, 236, which generates video including touch screen operations in the secure region and provides the video to video encryptor 252, which generates DRM protected video 250 for display in secure region 212 by touch screen display 204.

III. Example Computing Device Embodiments

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code (program instructions) configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SOC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 6:
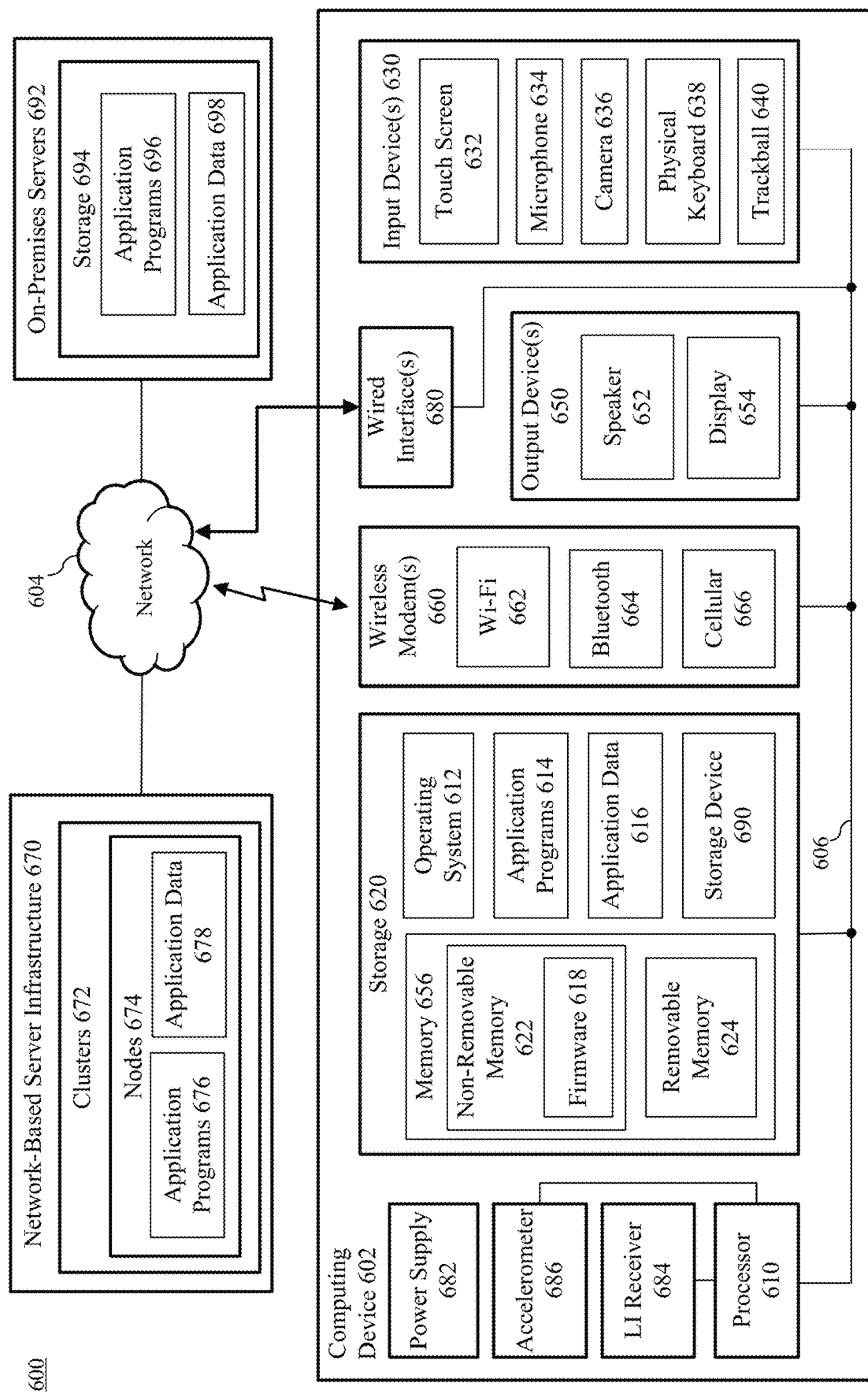
FIG. 6 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 6. FIG. 6 shows a block diagram of an exemplary computing environment 600 that includes a computing device 602. Computing device 602 is an example of computing device 102 of FIG. 1, which may include one or more of the components of computing device 602. In some embodiments, computing device 602 is communicatively coupled with devices (not shown in FIG. 6) external to computing environment 600 via network 604. Network 604 comprises one or more networks such as local area networks (LANs), wide area networks (WANs), enterprise networks, the Internet, etc., and may include one or more wired and/or wireless portions. Network 604 may additionally or alternatively include a cellular network for cellular communications. Computing device 602 is described in detail as follows.

Computing device 602 can be any of a variety of types of computing devices. For example, computing device 602 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 602 may alternatively be a stationary computing device such as a desktop computer, a personal computer (PC), a stationary server device, a minicomputer, a mainframe, a supercomputer, etc.

As shown in FIG. 6, computing device 602 includes a variety of hardware and software components, including a processor 610, a storage 620, one or more input devices 630, one or more output devices 650, one or more wireless modems 660, one or more wired interfaces 680, a power supply 682, a location information (LI) receiver 684, and an accelerometer 686. Storage 620 includes memory 656, which includes non-removable memory 622 and removable memory 624, and a storage device 690. Storage 620 also stores an operating system 612, application programs 614, and application data 616. Wireless modem(s) 660 include a Wi-Fi modem 662, a Bluetooth modem 664, and a cellular modem 666. Output device(s) 650 includes a speaker 652 and a display 654. Input device(s) 630 includes a touch screen 632, a microphone 634, a camera 636, a physical keyboard 638, and a trackball 640. Not all components of computing device 602 shown in FIG. 6 are present in all embodiments, additional components not shown may be present, and any combination of the components may be present in a particular embodiment. These components of computing device 602 are described as follows.

A single processor 610 (e.g., central processing unit (CPU), microcontroller, a microprocessor, signal processor, ASIC (application specific integrated circuit), and/or other physical hardware processor circuit) or multiple processors 610 may be present in computing device 602 for performing such tasks as program execution, signal coding, data processing, input/output processing, power control, and/or other functions. Processor 610 may be a single-core or multi-core processor, and each processor core may be single-threaded or multithreaded (to provide multiple threads of execution concurrently). Processor 610 is configured to execute program code stored in a computer readable medium, such as program code of operating system 612 and application programs 614 stored in storage 620. The program code is structured to cause processor 610 to perform operations, including the processes/methods disclosed herein. Operating system 612 controls the allocation and usage of the components of computing device 602 and provides support for one or more application programs 614 (also referred to as "applications" or "apps"). Application programs 614 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 602 can communicate with any other component according to function, although not all connections are shown for ease of illustration. For instance, as shown in FIG. 6, bus 606 is a multiple signal line communication medium (e.g., conductive traces in silicon, metal traces along a motherboard, wires, etc.) that may be present to communicatively couple processor 610 to various other components of computing device 602, although in other embodiments, an alternative bus, further buses, and/or one or more individual signal lines may be present to communicatively couple components. Bus 606 represents one or more of any of several types of bus structures, including a memory bus or memory controller, a peripheral bus, an accelerated graphics port, and a processor or local bus using any of a variety of bus architectures.

Storage 620 is physical storage that includes one or both of memory 656 and storage device 690, which store operating system 612, application programs 614, and application data 616 according to any distribution. Non-removable memory 622 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 622 may include main memory and may be separate from or fabricated in a same integrated circuit as processor 610. As shown in FIG. 6, non-removable memory 622 stores firmware 618, which may be present to provide low-level control of hardware. Examples of firmware 618 include BIOS (Basic Input/Output System, such as on personal computers) and boot firmware (e.g., on smart phones). Removable memory 624 may be inserted into a receptacle of or otherwise coupled to computing device 602 and can be removed by a user from computing device 602. Removable memory 624 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 690 may be present that are internal and/or external to a housing of computing device 602 and may or may not be removable. Examples of storage device 690 include a hard disk drive, a SSD, a thumb drive (e.g., a USB (Universal Serial Bus) flash drive), or other physical storage device.

One or more programs may be stored in storage 620. Such programs include operating system 612, one or more application programs 614, and other program modules and program data. Examples of such application programs may include, for example, computer program logic (e.g., computer program code/instructions) for implementing one or more of digitizer 108, 208, digitizer interposer 116*a*, 116*b*, 116*c*. 216, virtual desktop service 136, 236, along with any components and/or subcomponents thereof, as well as the flowcharts/flow diagrams (e.g., flowcharts 400, 420, 430, and/or 500) described herein, including portions thereof, and/or further examples described herein.

Storage 620 also stores data used and/or generated by operating system 612 and application programs 614 as application data 616. Examples of application data 616 include web pages, text, images, tables, sound files, video data, and other data, which may also be sent to and/or received from one or more network servers or other devices via one or more wired or wireless networks. Storage 620 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 602 through one or more input devices 630 and may receive information from computing device 602 through one or more output devices 650. Input device(s) 630 may include one or more of touch screen 632, microphone 634, camera 636, physical keyboard 638 and/or trackball 640 and output device(s) 650 may include one or more of speaker 652 and display 654. Each of input device(s) 630 and output device(s) 650 may be integral to computing device 602 (e.g., built into a housing of computing device 602) or external to computing device 602 (e.g., communicatively coupled wired or wirelessly to computing device 602 via wired interface(s) 680 and/or wireless modem(s) 660). Further input devices 630 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 654 may display information, as well as operating as touch screen 632 by receiving user commands and/or other information (e.g., by touch, finger gestures, virtual keyboard, etc.) as a user interface. Any number of each type of input device(s) 630 and output device(s) 650 may be present, including multiple microphones 634, multiple cameras 636, multiple speakers 652, and/or multiple displays 654.

One or more wireless modems 660 can be coupled to antenna(s) (not shown) of computing device 602 and can support two-way communications between processor 610 and devices external to computing device 602 through network 604, as would be understood to persons skilled in the relevant art(s). Wireless modem 660 is shown generically and can include a cellular modem 666 for communicating with one or more cellular networks, such as a GSM network for data and voice communications within a single cellular network, between cellular networks, or between the mobile device and a public switched telephone network (PSTN). Wireless modem 660 may also or alternatively include other radio-based modem types, such as a Bluetooth modem 664 (also referred to as a "Bluetooth device") and/or Wi-Fi modem 662 (also referred to as an "wireless adaptor"). Wi-Fi modem 662 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 664 is configured to communicate with another Bluetooth-capable device according to the Bluetooth short-range wireless technology standard(s) such as IEEE 802.15.1 and/or managed by the Bluetooth Special Interest Group (SIG).

Computing device 602 can further include power supply 682, LI receiver 684, accelerometer 686, and/or one or more wired interfaces 680. Example wired interfaces 680 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 680 of computing device 602 provide for wired connections between computing device 602 and network 604, or between computing device 602 and one or more devices/peripherals when such devices/peripherals are external to computing device 602 (e.g., a pointing device, display 654, speaker 652, camera 636, physical keyboard 638, etc.). Power supply 682 is configured to supply power to each of the components of computing device 602 and may receive power from a battery internal to computing device 602, and/or from a power cord plugged into a power port of computing device 602 (e.g., a USB port, an A/C power port). LI receiver 684 may be used for location determination of computing device 602 and may include a satellite navigation receiver such as a Global Positioning System (GPS) receiver or may include other type of location determiner configured to determine location of computing device 602 based on received information (e.g., using cell tower triangulation, etc.). Accelerometer 686 may be present to determine an orientation of computing device 602.

Note that the illustrated components of computing device 602 are not required or all-inclusive, and fewer or greater numbers of components may be present as would be recognized by one skilled in the art. For example, computing device 602 may also include one or more of a gyroscope, barometer, proximity sensor, ambient light sensor, digital compass, etc. Processor 610 and memory 656 may be co-located in a same semiconductor device package, such as being included together in an integrated circuit chip, FPGA, or system-on-chip (SOC), optionally along with further components of computing device 602.

In embodiments, computing device 602 is configured to implement any of the above-described features of flowcharts herein. Computer program logic for performing any of the operations, steps, and/or functions described herein may be stored in storage 620 and executed by processor 610.

In some embodiments, server infrastructure 670 may be present in computing environment 600 and may be communicatively coupled with computing device 602 via network 604. Server infrastructure 670, when present, may be a network-accessible server set (e.g., a cloud-based environment or platform). As shown in FIG. 6, server infrastructure 670 includes clusters 672. Each of clusters 672 may comprise a group of one or more compute nodes and/or a group of one or more storage nodes. For example, as shown in FIG. 6, cluster 672 includes nodes 674. Each of nodes 674 are accessible via network 604 (e.g., in a "cloud-based" embodiment) to build, deploy, and manage applications and services. Any of nodes 674 may be a storage node that comprises a plurality of physical storage disks, SSDs, and/or other physical storage devices that are accessible via network 604 and are configured to store data associated with the applications and services managed by nodes 674. For example, as shown in FIG. 6, nodes 674 may store application data 678.

Each of nodes 674 may, as a compute node, comprise one or more server computers, server systems, and/or computing devices. For instance, a node 674 may include one or more of the components of computing device 602 disclosed herein. Each of nodes 674 may be configured to execute one or more software applications (or "applications") and/or services and/or manage hardware resources (e.g., processors, memory, etc.), which may be utilized by users (e.g., customers) of the network-accessible server set. For example, as shown in FIG. 6, nodes 674 may operate application programs 676. In an implementation, a node of nodes 674 may operate or comprise one or more virtual machines, with each virtual machine emulating a system architecture (e.g., an operating system), in an isolated manner, upon which applications such as application programs 676 may be executed.

In an embodiment, one or more of clusters 672 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 672 may be a datacenter in a distributed collection of datacenters. In embodiments, exemplary computing environment 600 comprises part of a cloud-based platform such as Amazon Web Services® of Amazon Web Services, Inc., or Google Cloud Platform™ of Google LLC, although these are only examples and are not intended to be limiting.

In an embodiment, computing device 602 may access application programs 676 for execution in any manner, such as by a client application and/or a browser at computing device 602. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 602 may additionally and/or alternatively synchronize copies of application programs 614 and/or application data 616 to be stored at network-based server infrastructure 670 as application programs 676 and/or application data 678. For instance, operating system 612 and/or application programs 614 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 620 at network-based server infrastructure 670.

In some embodiments, on-premises servers 692 may be present in computing environment 600 and may be communicatively coupled with computing device 602 via network 604. On-premises servers 692, when present, are hosted within an organization's infrastructure and, in many cases, physically onsite of a facility of that organization. On-premises servers 692 are controlled, administered, and maintained by IT (Information Technology) personnel of the organization or an IT partner to the organization. Application data 698 may be shared by on-premises servers 692 between computing devices of the organization, including computing device 602 (when part of an organization) through a local network of the organization, and/or through further networks accessible to the organization (including the Internet). Furthermore, on-premises servers 692 may serve applications such as application programs 696 to the computing devices of the organization, including computing device 602. Accordingly, on-premises servers 692 may include storage 694 (which includes one or more physical storage devices such as storage disks and/or SSDs) for storage of application programs 696 and application data 698 and may include one or more processors for execution of application programs 696. Still further, computing device 602 may be configured to synchronize copies of application programs 614 and/or application data 616 for backup storage at on-premises servers 692 as application programs 696 and/or application data 698.

Embodiments described herein may be implemented in one or more of computing device 602, network-based server infrastructure 670, and on-premises servers 692. For example, in some embodiments, computing device 602 may be used to implement systems, clients, or devices, or components/subcomponents thereof, disclosed elsewhere herein. In other embodiments, a combination of computing device 602, network-based server infrastructure 670, and/or on-premises servers 692 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 620. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 614) may be stored in storage 620. Such computer programs may also be received via wired interface(s) 680 and/or wireless modem(s) 660 over network 604. Such computer programs, when executed or loaded by an application, enable computing device 602 to implement features of embodiments discussed herein. Accordingly, such computer programs represent controllers of the computing device 602.

Embodiments are also directed to computer program products comprising computer code or instructions stored on any computer-readable medium or computer-readable storage medium. Such computer program products include the physical storage of storage 620 as well as further physical storage types.

V. Additional Example Embodiments

Systems, methods, and instrumentalities are described herein related to a secured stylus. Secure inking may result in secured cloud notes. A secure connection may be established between a digitizer processor (e.g., microcontroller) in a computing device and a remote server providing virtual desktop infrastructure (VDI), which uses virtual machines to provide and manage virtual desktops (e.g., VDI hosts desktop environments on server(s) and deploys them to end-users on request). A user may connect a computing device to a remote computer while concealing stylus input and feedback from the device processor and operating system (OS). A digitizer interposer may be implemented in the computing device, the server, and/or between them. Raw digitizer input may be protected by encryption and/or by bypassing the OS and processor of a user computing device. Digitizer signal processing, normally performed by the OS, may be distributed among edge and cloud servers. For example, an edge digitizer interposer may generate and provide time-sensitive sensory feedback (e.g., haptic feedback to a stylus and/or display of temporary digital ink as a user creates the digital ink while a cloud server processes inking data to update video content for display by the user computing device in a secure area/window). A secure connection may be established between a GPU and the remote server, protecting secure connection video generated by the server by encryption (e.g., digital rights management (DRM)) and/or bypassing the OS and processor of the user computing device.

In some examples, a system with a secure stylus for secure touch input and/or display may comprise a processor circuit and a memory. The memory stores program code that is executable by the processor circuit. The program code may comprise a digitizer interposer configured to receive, from a digitizer processor in a computing device. (e.g., encrypted) inking data representative of touch screen operations performed in at least a secure region of a touch screen of the computing device that is displaying at least the secure region generated by a remote device (e.g., a server). The digitizer interposer may process the inking data, e.g., at least in part, to provide time-sensitive information to the digitizer processor (e.g., haptic feedback, temporary inking for display). The digitizer interposer may provide at least a portion of the inking data to the server, which may be configured to process the inking data and generate video data for display by the computing device representative of the touch screen operations performed in at least the secure region.

In some examples, the digitizer interposer may be located, at least in part, in the server or between the computing device and the server. The digitizer interposer may be configured to receive, from the digitizer processor, encrypted inking data representative of the touch screen operations performed on at least a secure region of the touch screen of the computing device displaying at least the secure region generated by the server. The digitizer interposer may be configured to decrypt the encrypted inking data.

In some examples, the interposer device may be located, at least in part, in the computing device. The digitizer interposer may be configured to receive, from the digitizer processor, raw inking data representative of the touch screen operations performed in at least a secure region of the touch screen of the computing device displaying at least the secure region generated by the server.

In some examples, the digitizer interposer may be (e.g., further) configured to process the inking data, at least in part, by performing at least one operation on the inking data that would otherwise be performed by an operating system executed by a processor in the computing device.

In some examples, the digitizer interposer may be (e.g., further) configured to determine whether the touch screen operations occurred in the secure region based on the decrypted inking data.

In some examples, the digitizer interposer may be configured to provide the time-sensitive information by generating haptic feedback based on the inking data indicating use of a stylus; and provide the haptic feedback to the digitizer processor configured to provide the haptic feedback to the stylus.

In some examples, the digitizer interposer may be the digitizer interposer may be configured to provide the time-sensitive information by generating temporary digital ink based on the inking data. The temporary digital ink may be configured for integrated display with the video data generated by the server. The digitizer interposer may provide the temporary digital ink to the computing device for display to a user.

In some examples, the digitizer interposer configuration to generate the temporary digital ink may comprise a configuration to receive inking parameters from the server; and generate the temporary digital ink based on the inking data and the inking parameters.

In some examples, the digitizer interposer may be (e.g., further) configured to define a region of interest as the secure region to interpose touch screen operations; and provide the region of interest to the digitizer processor to determine touch screen operations outside the region of interest to send to an operating system executed by a processor in the computing device.

A method for may be implemented in a digitizer interposer. The method may comprise, for example, receiving, from a digitizer processor in a computing device, inking data representative of touch screen operations performed in at least a secure region of a touch screen of the computing device that is displaying at least the secure region generated by a server. The inking data may be processed, at least in part, to provide time-sensitive information to the digitizer processor. At least a portion of the inking data may be provided to the server configured to generate video data for display by the computing device representative of the touch screen operations performed in at least the secure region.

In some examples, the digitizer interposer may be located, at least in part, in the server or between the computing device and the server. The digitizer interposer may receive from the digitizer processor, encrypted inking data representative of the touch screen operations performed on at least a secure region of the touch screen of the computing device displaying at least the secure region generated by the server.

In some examples, the digitizer interposer may be located, at least in part, in the computing device. The digitizer interposer may receive, from the digitizer processor, raw inking data representative of the touch screen operations performed in at least a secure region of the touch screen of the computing device displaying at least the secure region generated by the server.

In some examples, the processing of the inking data, at least in part, may comprise performing at least one operation on the inking data that would otherwise be performed by an operating system executed by a processor in the computing device.

In some examples, the method may (e.g., further) comprise determining whether the touch screen operations occurred in the secure region based on the decrypted inking data.

In some examples, the processing of the inking data, at least in part, to provide time-sensitive information to the digitizer processor may comprise generating haptic feedback based on the inking data indicating use of a stylus; and providing the haptic feedback to the digitizer processor configured to provide the haptic feedback to the stylus.

In some examples, the processing of the inking data, at least in part, to provide time-sensitive information to the digitizer processor may comprise generating temporary digital ink based on the inking data, the temporary digital ink configured for integrated display with the video data generated by the server; and providing the temporary digital ink to the computing device.

In some examples, generating temporary digital ink may comprise receiving inking parameters from the server; and generating the temporary digital ink based on the inking data and the inking parameters.

In some examples, the method may (e.g., further) comprise defining a region of interest as the secure region to interpose touch screen operations; and providing the region of interest to the digitizer processor to determine touch screen operations outside the region of interest to send to an operating system executed by a processor in the computing device.

A computer-readable storage medium is described herein. The computer-readable storage medium has computer program logic recorded thereon that when executed by a processor circuit causes the processor circuit to perform a method. The method may comprise, for example, receiving, from a digitizer processor in a computing device, inking data representative of touch screen operations performed in at least a secure region of a touch screen of the computing device that is displaying at least the secure region generated by a server. The inking data may be processed, at least in part, to provide time-sensitive information to the digitizer processor. At least a portion of the inking data may be provided to the server configured to generate video data for display by the computing device representative of the touch screen operations performed in at least the secure region.

In some examples, the processing of the inking data, at least in part, to provide time-sensitive information to the digitizer processor, may comprise at one of the following: generating haptic feedback based on the inking data indicating use of a stylus and providing the haptic feedback to the digitizer processor configured to provide the haptic feedback to the stylus; or generating temporary digital ink based on the inking data, the temporary digital ink configured for integrated display with the video data generated by the server and providing the temporary digital ink to the computing device.

In some examples, the method may (e.g., further) comprise performing one or more of the following: processing the inking data, at least in part, by performing at least one operation on the inking data that would otherwise be performed by an operating system executed by a processor in the computing device; determining whether the touch screen operations occurred in the secure region based on the decrypted inking data; generating haptic feedback based on the inking data indicating use of a stylus and providing the haptic feedback to the digitizer processor configured to provide the haptic feedback to the stylus; generating temporary digital ink based on the inking data, the temporary digital ink configured for integrated display with the video data generated by the server and providing the temporary digital ink to the computing device; receiving inking parameters from the server and generating the temporary digital ink based on the inking data and the inking parameters; and/or defining a region of interest as the secure region to interpose touch screen operations and providing the region of interest to the digitizer processor to determine that touch screen operations outside the region of interest are sent to an operating system executed by a processor in the computing device.

VI. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

Moreover, according to the described embodiments and techniques, any components of systems, computing devices, servers, device management services, virtual machine provisioners, applications, and/or data stores and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (e.g., or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (e.g., computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A digitizer interposer, comprising:
   a processor; and
   a memory that stores program code structured to cause the processor to:
   receive encrypted inking data from a digitizer processor in a computing device, the encrypted inking data representative of touch screen operations by a touch instrument on a touch screen;
   decrypt the encrypted inking data;
   determine, based at least on the encrypted inking data, position information indicating the touch screen operations occurred within a secure region of the touch screen, the secure region generated by a server; and
   provide the position information to the server, the server configured to generate video data based at least on the position information for display by the computing device in the secure region, the video data representative of the touch screen operations.

2. The digitizer interposer of claim 1, wherein the program code is further structured to cause the processor to:
   generate haptic information based on the decrypted inking data; and
   provide the haptic information to the digitizer processor to provide to the touch instrument, the touch instrument configured to provide haptic feedback to a user based on the haptic information.

3. The digitizer interposer of claim 1, wherein the program code is further structured to cause the processor to:
   generate temporary digital ink based on the decrypted inking data; and
   provide the temporary digital ink to the computing device, the temporary digital ink configured to be temporarily displayed by the touch screen in the secure region along with the video data.

4. The digitizer interposer of claim 3, wherein to provide the temporary digital ink, the program code is further structured to cause the processor to:
   provide the temporary digital ink to the computing device through a video encryptor configured to blend the temporary digital ink with the video data.

5. The digitizer interposer of claim 3, wherein to generate temporary digital ink based on the decrypted inking data, the program code is further structured to cause the processor to:
   receive inking parameters from the server; and
   generate the temporary digital ink based on the inking data and the inking parameters.

6. The digitizer interposer of claim 1, wherein a region of the touch screen outside the region of interest is considered an unsecure region.

7. The digitizer interposer of claim 6, wherein the program code is further structured to cause the processor to:
   receive a definition of a region of interest as the secure region; and
   provide the definition of the region of interest to the digitizer processor, the digital processor configured to determine touch screen operations outside the region of interest; and
   send the touch screen operations determined to be outside the region of interest to an operating system executed by a processor in the computing device.

8. A method in a digitizer interposer, comprising:
receiving encrypted inking data from a digitizer processor in a computing device, the encrypted inking data representative of touch screen operations by a touch instrument on a touch screen;
decrypting the encrypted inking data;
determining, based at least on the encrypted inking data, position information indicating the touch screen operations occurred within a secure region of the touch screen, the secure region generated by a server; and
providing the position information to the server, the server configured to generate video data based at least on the position information for display by the computing device in the secure region, the video data representative of the touch screen operations.

9. The method of claim 8, further comprising:
generating haptic information based on the decrypted inking data; and
providing the haptic information to the digitizer processor to provide to the touch instrument, the touch instrument configured to provide haptic feedback to a user based on the haptic information.

10. The method of claim 8, further comprising:
generating temporary digital ink based on the decrypted inking data; and
providing the temporary digital ink to the computing device, the temporary digital ink configured to be temporarily displayed by the touch screen in the secure region along with the video data.

11. The method of claim 10, wherein said providing the temporary digital ink comprises:
providing the temporary digital ink to the computing device through a video encryptor configured to blend the temporary digital ink with the video data.

12. The method of claim 10, wherein said generating temporary digital ink based on the decrypted inking data comprises:
receiving inking parameters from the server; and
generating the temporary digital ink based on the inking data and the inking parameters.

13. The method of claim 8, wherein a region of the touch screen outside the region of interest is considered an unsecure region.

14. The method of claim 13, further comprising:
receiving a definition of a region of interest as the secure region; and
providing the definition of the region of interest to the digitizer processor, the digital processor configured to determine touch screen operations outside the region of interest; and
send the touch screen operations determined to be outside the region of interest to an operating system executed by a processor in the computing device.

15. A computer-readable storage medium having program instructions recorded thereon that, when executed by at least one processor, perform a method comprising:
receiving encrypted inking data from a digitizer processor in a computing device, the encrypted inking data representative of touch screen operations by a touch instrument on a touch screen;
decrypting the encrypted inking data;
determining, based at least on the encrypted inking data, position information indicating the touch screen operations occurred within a secure region of the touch screen, the secure region generated by a server; and
providing the position information to the server, the server configured to generate video data based at least on the position information for display by the computing device in the secure region, the video data representative of the touch screen operations.

16. The computer-readable storage medium of claim 15, the method further comprising:
generating haptic information based on the decrypted inking data; and
providing the haptic information to the digitizer processor to provide to the touch instrument, the touch instrument configured to provide haptic feedback to a user based on the haptic information.

17. The computer-readable storage medium of claim 15, the method further comprising:
generating temporary digital ink based on the decrypted inking data; and
providing the temporary digital ink to the computing device, the temporary digital ink configured to be temporarily displayed by the touch screen in the secure region along with the video data.

18. The computer-readable storage medium of claim 17, wherein said providing the temporary digital ink comprises:
providing the temporary digital ink to the computing device through a video encryptor configured to blend the temporary digital ink with the video data.

19. The computer-readable storage medium of claim 17, wherein said generating temporary digital ink based on the decrypted inking data comprises:
receiving inking parameters from the server; and
generating the temporary digital ink based on the inking data and the inking parameters.

20. The computer-readable storage medium of claim 15, wherein a region of the touch screen outside the region of interest is considered an unsecure region, the method further comprising:
receiving a definition of a region of interest as the secure region; and
providing the definition of the region of interest to the digitizer processor, the digital processor configured to determine touch screen operations outside the region of interest; and
send the touch screen operations determined to be outside the region of interest to an operating system executed by a processor in the computing device.

* * * * *